United States Patent
Catherwood et al.

(10) Patent No.: US 8,688,964 B2
(45) Date of Patent: Apr. 1, 2014

(54) PROGRAMMABLE EXCEPTION PROCESSING LATENCY

(75) Inventors: Michael I. Catherwood, Georgetown, TX (US); David Mickey, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 556 days.

(21) Appl. No.: 12/776,513

(22) Filed: May 10, 2010

(65) Prior Publication Data

US 2011/0016295 A1 Jan. 20, 2011

Related U.S. Application Data

(60) Provisional application No. 61/226,924, filed on Jul. 20, 2009.

(51) Int. Cl.
*G06F 9/44* (2006.01)
(52) U.S. Cl.
USPC .......................................... 712/244; 710/260
(58) Field of Classification Search
USPC .................... 710/260; 712/221, 244
See application file for complete search history.

(56) References Cited

U.S. PATENT DOCUMENTS

| 5,708,817 | A * | 1/1998 | Ng et al. | 710/266 |
| 6,477,600 | B1 * | 11/2002 | Baxter et al. | 710/260 |
| 8,010,726 | B2 * | 8/2011 | Francis | 710/266 |
| 2005/0010707 | A1 * | 1/2005 | Francis | 710/260 |

FOREIGN PATENT DOCUMENTS

| EP | 0735462 A2 | 10/1996 | G06F 9/38 |
| EP | 735462 A2 * | 10/1996 | G06F 9/38 |

OTHER PUBLICATIONS

Microchip Technology Inc., PIC24F Family Reference Manual, Micro Technology Inc., Apr. 2006, Revision A, Section 8.3, pp. 9-10.*
International PCT Search Report and Written Opinion, PCT/US2010/042101, 6 pages, mailed Sep. 13, 2010.

* cited by examiner

*Primary Examiner* — Andrew Caldwell
*Assistant Examiner* — Yuqing Xiao
(74) *Attorney, Agent, or Firm* — King & Spalding L.L.P.

(57) ABSTRACT

A digital processor with programmable exception processing latency, may have a central processing unit (CPU) of a digital processor, an exception controller coupled with the CPU, and a control register coupled with the CPU, wherein the control register is operable to set the operation mode of the CPU in at least one of two modes, wherein in the first mode the CPU has a fixed exception processing latency time, and in a second mode the CPU has a variable exception processing latency time.

22 Claims, 19 Drawing Sheets

PROGRAMMABLE EXCEPTION PROCESSING LATENCY

CROSS-REFERENCE TO RELATED APPLICATIONS

This application claims the benefit of U.S. Provisional Application No. 61/226,924 filed on Jul. 20, 2009, entitled "PROGRAMMABLE EXCEPTION PROCESSING LATENCY", which is incorporated herein in its entirety.

TECHNICAL FIELD

The present disclosure relates to digital processors, and, more particularly, to exception latency in a digital processor.

BACKGROUND

Digital processors operate generally synchronous to a processing clock by sequentially execution instructions that are stored in a program memory. However, such processors have to interface with external devices. One means of interfacing is performed by a so-called interrupt. Such an event interrupts the sequential execution of a program and forces the processor to enter into an exception state in which the processor executes a so-called interrupt service routine. During this service routine the external event is processed. Contrary to the synchronous execution of a 'normal' program an interrupt signal generally occurs asynchronously. In other words, such an external signal may occur at any time during the execution of a currently processed instruction. Such an interrupt is generally acknowledged in the following cycle. To pre-process the interrupt, depending on implementation, the currently pending instruction or even the next following instruction is generally executed before the processor is interrupted. The time from the occurrence of an external interrupt to the time at which the service routine is actually executed is called latency. This latency depends on the respective design of a processor and can vary from type to type.

Many digital processors have instructions of variable execution time. However, many designs into which such processors are incorporated, require a known interrupt latency so that processes can be controlled properly. Therefore, digital processors are sometimes designed to have a constant or fixed interrupt latency. In such digital processors having fixed latency the exception processing preamble must be long enough to accommodate the completion of the longest instruction. If it is not, the latency between the interrupt assertion and the start of the Interrupt Service Routine (ISR) will vary depending upon which instruction the central processing unit (CPU) was executing at the time of the exception, and may introduce "latency jitter." Fixed latency solves the "latency jitter" issue but at the expense of wasted interrupt response time. In CPUs with deep instruction pipelines and/or instruction pre-fetch logic, the worse case preamble necessary to support fixed latency can become very long. This can be very restrictive for a user.

Therefore there exists a need for a more flexible processor in handling and in particular pre-processing interrupts.

SUMMARY

According to an embodiment, a digital processor having programmable exception processing latency, may comprise a central processing unit (CPU) of a digital processor, an exception controller coupled with said CPU, and a control register coupled with said CPU, wherein the control register is operable to set the operation mode of said CPU in at least one of two modes, wherein in the first mode the CPU has a fixed exception processing latency time, and in a second mode the CPU has a variable exception processing latency time.

According to a further embodiment, the exception controller can be an interrupt controller. According to a further embodiment, the digital processor can be a microcontroller or digital signal processor. According to a further embodiment, the control register may comprise a latency selection bit which is programmable. According to a further embodiment, the latency selection bit in the control register may be dynamically programmable depending upon a software application. According to a further embodiment, the second mode may only be selected when a latency of an exception is less or equal a predefined threshold. According to a further embodiment, the predefined threshold can be programmable. According to a further embodiment, the predefined threshold can be stored in said control register. According to a further embodiment, the digital processor may further comprise a counter operable to generate a signal for stalling an execution unit in said CPU.

According to another embodiment, a method for processing an exception in a processor, may comprise: setting one of at least two operating modes for the processor; receiving an exception;

Pre-processing the exception; and executing an exception service routine; wherein in a first mode the processor has a fixed exception processing latency time, and in a second mode the processor has a variable exception processing latency time.

According to a further embodiment of the method, the step of setting one of at least two operating modes for the processor can be performed by programming a latency selection bit in a control register. According to a further embodiment of the method, the latency selection bit in the control register may be dynamically programmed depending upon a software application. According to a further embodiment of the method, the second mode may only be selected when a latency of an exception is less or equal a predefined threshold. According to a further embodiment of the method, the predefined threshold can be programmable. According to a further embodiment of the method, the predefined threshold can be stored in said control register. According to a further embodiment of the method, a pending instruction may be executed before execution of the exception service routine, said pending instruction requires a specific number of processing cycles for execution and wherein the processor can execute a plurality of instructions which require for execution at least one of a minimum amount of processing cycles and a maximum amount of processing cycle. According to a further embodiment of the method, in the first mode the first number of processing cycles can be extended to the maximum amount of processing cycles. According to a further embodiment of the method, the first number of processing cycles may be extended by inserting one or more no-operation instructions. According to a further embodiment of the method, the first number of processing cycles may be extended by stalling said processor. According to a further embodiment of the method, the first number of processing cycles, may be only extended by inserting one or more no-operation instructions if the first number of processing cycles is equal or less a predefined threshold.

BRIEF DESCRIPTION OF THE DRAWINGS

A more complete understanding of the present disclosure and advantages thereof may be acquired by referring to the following description taken in conjunction with the accompanying drawings wherein.

Figure 1:
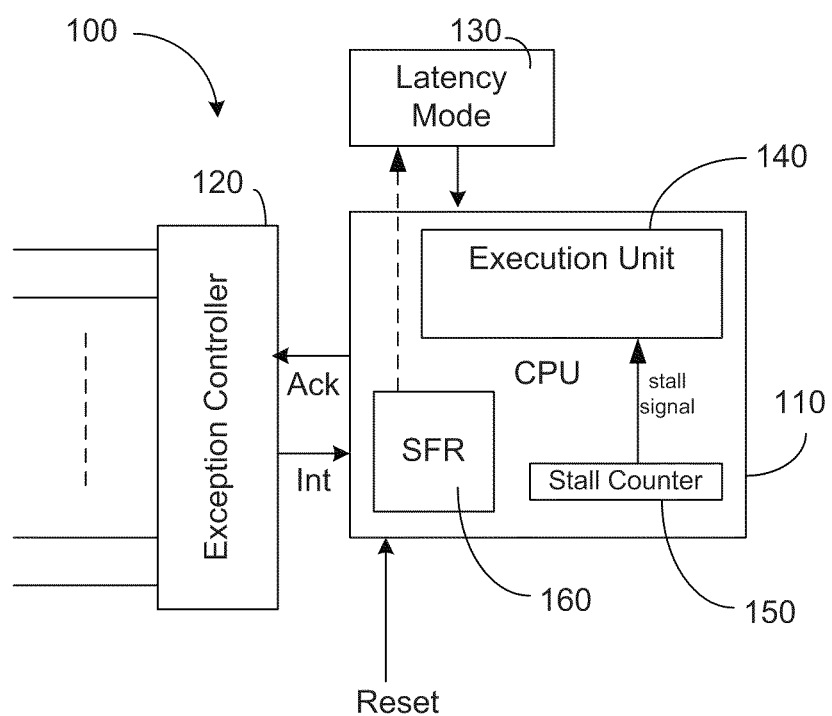
FIG. 1 is a schematic block diagram of a CPU and associated interrupt controller according to an embodiment.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

DETAILED DESCRIPTION

According to the teachings of this disclosure, a processor can be designed that operates in at least two modes wherein a first mode provides for a fixed latency in which all exceptions have the same latency. A second mode can be set in which the processor has a variable latency which depends on the pending instruction during which the exception occurred. An exception can be any type of external or internal interrupt or a trap caused within a processing unit. A pending instruction is to be understood as the instruction that has to be executed before the exception can be processed. In many processor architectures this instruction is the instruction which is executed in the cycle following the cycle during which the exception occurred. However, depending on the embodiment, it could also be the instruction which is pending while the interrupt occurs. A control register can be used that provides for example for a bit that selects either the first or second mode. However, other means to signal a specific operating modes can be used such as an external signal fed to a pin of the processor chip. This allows for dynamically changing the operation mode in programs that comprise sections requiring a fixed latency and other sections that don't.

For example, according to an embodiment, a control bit stored in a control register of the CPU can be added to modify the exception processing flow of the central processing unit (CPU) of the digital processor. When this bit is clear, conventional fixed latency is supported by the CPU. When this bit is set, the exception processing flow does not pad the preamble beyond that required to complete a single cycle instruction. Exception processing is halted for longer instructions, adding to exception latency only when necessary. Although the exception response time will be variable, it will typically be much improved beyond that of the fixed latency option.

Furthermore, the user can thus choose how much additional worst case latency and "latency jitter" can be accepted by restricting the execution of some (longer) instructions. It is contemplated and within the scope of this disclosure to dynamically switch between fixed and variable latency depending upon what the application code is required to do.

Certain digital processors, e.g., microcontrollers, use mostly instructions that are single cycle operations however may also provide for one or more instructions which require more than one cycle. Therefore the exception latency due to instruction completion is therefore generally short. So supporting a variable latency exception processing flow can yield latency improvement almost all of the time.

Many applications have different operating modes themselves. In certain case, some modes might be better suited to fixed latency exceptions, others to variable latency exceptions. Therefore, having a user programmable control bit to select between fixed and variable latency allows the user to dynamically switch between exception latency operating modes (fixed versus variable latency).

FIG. 1 shows a simplified block diagram of a system 100 including a central processing unit (CPU) 110 which is coupled with an exception controller 120 generating an interrupt or a trap. CPU 110 may comprise an execution unit for executing instructions, for example an execution pipeline. This exception controller can be for example an interrupt controller capable of receiving a plurality interrupt signals. If the exception controller 120 is for example an interrupt controller, it will generate a single interrupt signal Int which is fed to CPU 110. CPU can acknowledge the interrupt signal with a respective signal Ack. Interrupt controller 120 may include priority handling and other mechanism as well known in the art. Moreover, the CPU can be designed to handle more than one interrupt signal based on a priority mechanism. FIG. 1 also shows a reset signal which is fed to CPU 110 which may not be considered to form an exception but also could be considered as such. An operating mode register 130 is provided which is coupled with the CPU. This register 130 may include one or more bits that indicate to the CPU 110 in which mode the CPU 110 is to operate. For example, a single bit could be used and this bit could be part of a general operating mode register capable of determining other operating modes or configurations. This register could also store a threshold value for triggering a mode switch which will be explained in more detail below. In a dual mode system, if set to 1, this bit forces the CPU 110 to operate with a variable exception latency wherein the exception latency depends on which type of instruction was pending when the exception occurred. If this bit is set to 0, the CPU operates with a fixed or constant latency wherein shorter instructions are padded with no-operation (NOP) cycles by forcing them into the execution unit or the execution unit 140 is stalled to extend the execution time of every pending instruction to a maximum pendency, in other words to the longest execution time of any instruction that the processor can execute. To this end, according to one embodiment, a stall counter 150 may be implemented to count the necessary forced no-operation (FNOP) cycles or to provide for the necessary delay signals.

Figure 2:
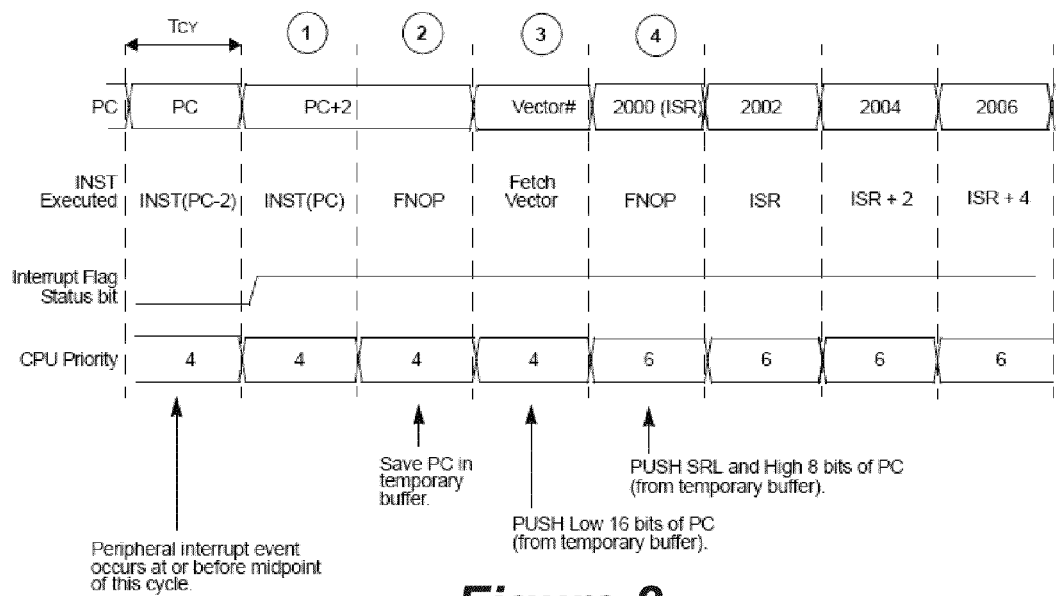
FIGS. 2-4 show timing diagrams of fixed interrupt latencies.

FIG. 2 shows an example of such padding with no-operation cycles for a single cycle instruction. However other means of extending the latency may be used. For example any type of stalling the processor to extend the execution time could be used. In FIG. 2 a sequence of events is shown when a peripheral interrupt is asserted during a one-cycle instruction. The interrupt process takes four instruction cycles. Each cycle is numbered in FIG. 2 for reference. The interrupt flag status bit is set during the instruction cycle after the peripheral interrupt occurs. The current or pending instruction INST (PC) completes during this instruction cycle. In the second instruction cycle after the interrupt event, the contents of the program counter (PC) and status register (SRL) registers are saved into a temporary buffer register. The second cycle of the interrupt process is executed as a no-operation instruction FNOP (padding) to maintain consistency with the sequence taken during a longer two-cycle instruction. In the third cycle, the PC is loaded with the vector table address for the interrupt source and the starting address of the interrupt service routine (ISR) is fetched. In the fourth cycle, the PC is loaded with the ISR address. The fourth cycle is executed as a FNOP while the first instruction in the ISR is fetched. This fourth cycle may be required for any instruction and is not considered as the above mentioned padding. Other processor architectures may include different execution mechanism that do not require any type of no-operation instruction insertion and may have other means to stall the execution of a pending instruction. The principles described herein equally apply to such designs.

Figure 3:
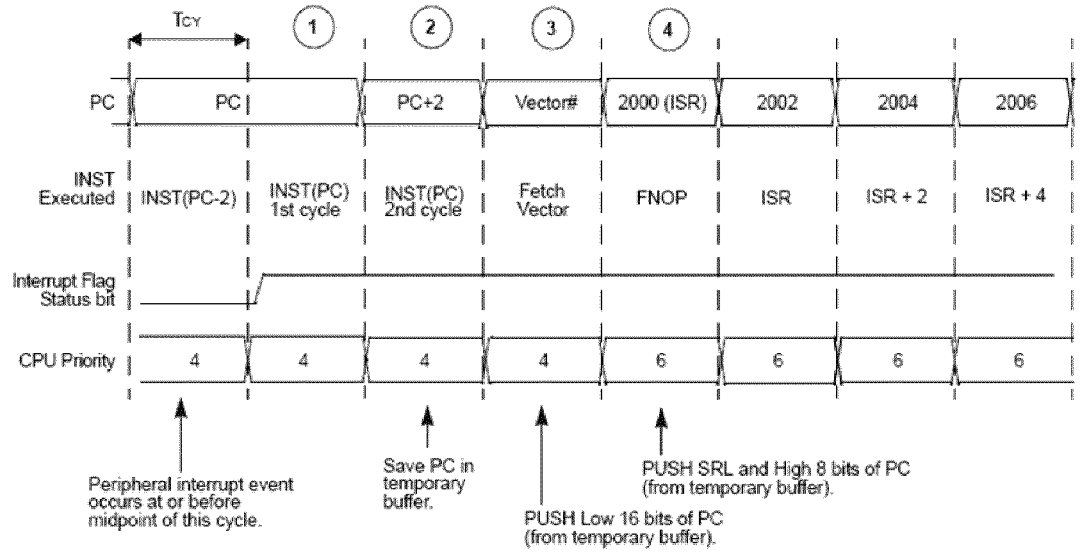
Figure 4:
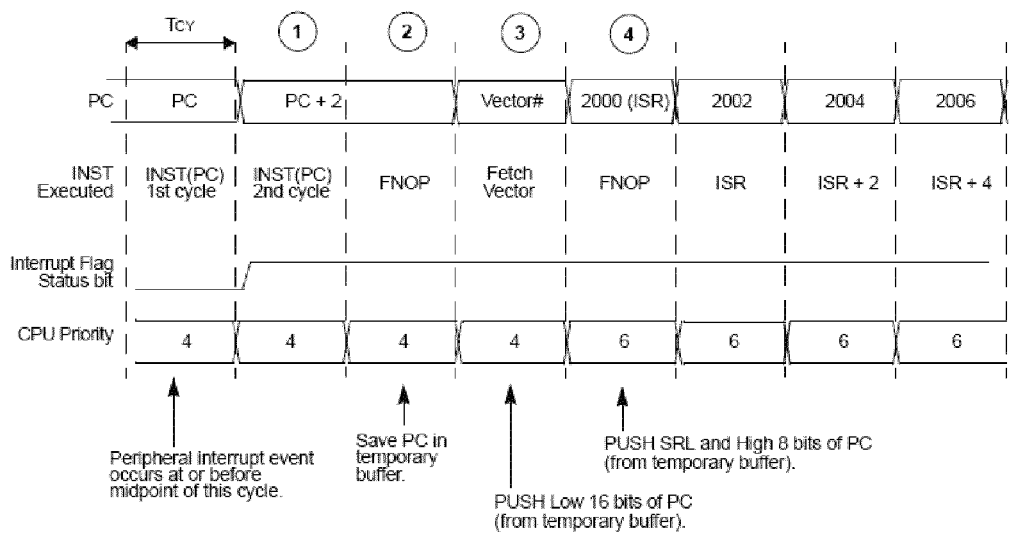

FIGS. 3 and 4 shows examples of a two cycle instruction. In the fixed latency mode, the interrupt latency during a two-cycle instruction is the same as during a one-cycle instruction. The first and second cycle of the interrupt process allow the two-cycle instruction to complete execution. The timing diagram in FIG. 3 shows the case when the peripheral interrupt event occurs in the instruction cycle prior to execution of the two-cycle instruction. FIG. 4 shows the timing when a peripheral interrupt is coincident with the first cycle of a two-cycle instruction. In this case, the interrupt process completes as for a one-cycle instruction by insertion of a FNOP instruction similar as shown in FIG. 2. For the variable mode, no such padding or stalling is performed. Thus, the latency may thus vary from instruction to instruction depending on which instruction is pending when the exception occurred.

Figure 5:
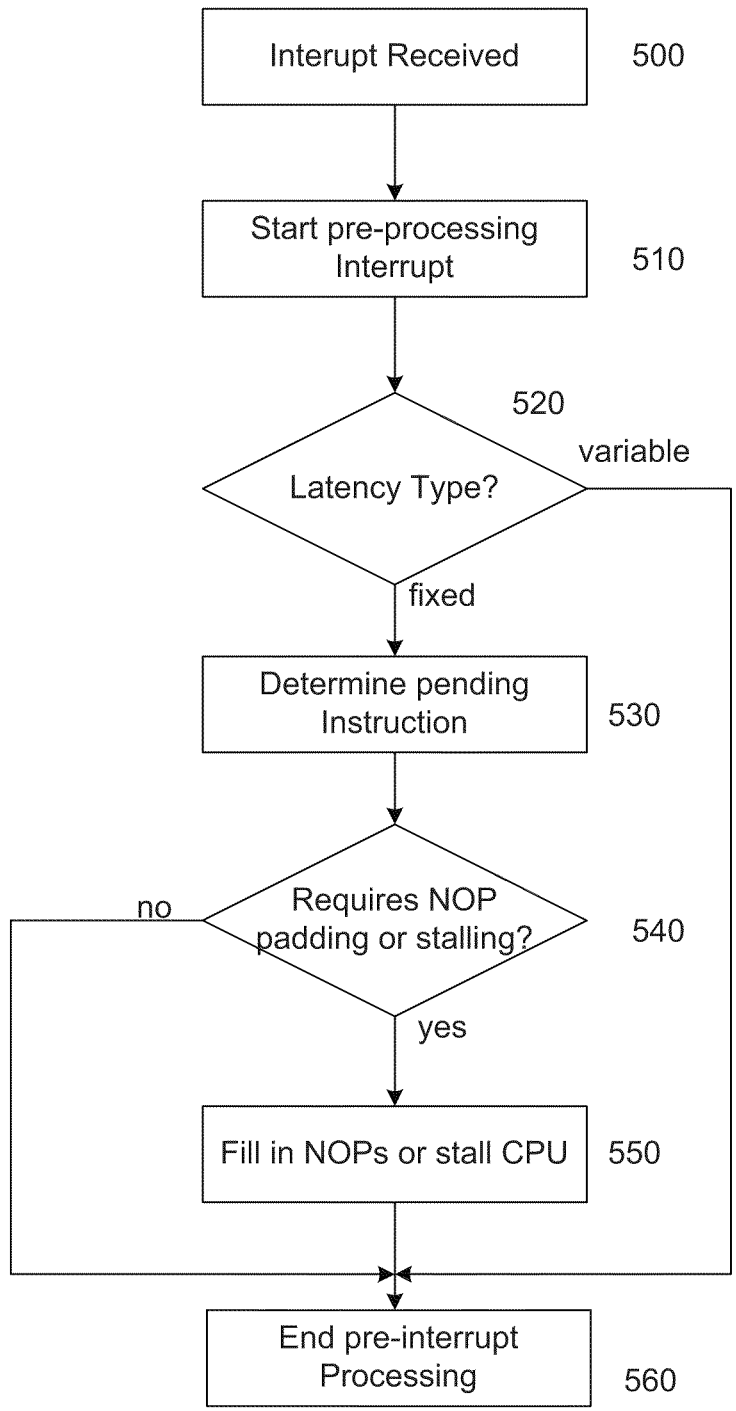
FIG. 5 is a flow-chart showing the principal operation of a first embodiment.

FIG. 5 shows a flow chart according to the above described principles. In step 500 an interrupt signal is received by the CPU. In step 510 the pre-processing of the interrupt starts. During pre-processing which lasts from step 510 to step 560 the so-called house cleaning is performed. For example, the program counter (PC) and status register (SR) is pushed onto the stack. Other variables could be saved as well. However, most processors need to only save the PC and SR as other registers can be saved during the service of the interrupt. In step 520 it is checked whether a variable or fixed latency mode will be used. In case of a fixed latency mode, it is determined in step 530 which instruction is currently pending. Again, this is the instruction that has to be executed or finished execution before the interrupt service routine can start and, thus, in relation to the occurrence of the actual interrupt, it may vary from processor design to processor design which instruction this is. In step 540 is determined whether this pending instruction requires padding or stalling and how many additional cycles are required. For example, if the longest instruction that can be executed requires 5 cycles and the shortest instruction requires 1 cycle, a 1-cycle instruction must be padded with 4 no-operation (NOP) cycles or stalled respectively. In such a processor, a 2-cycle instruction may be padded with 3-4 NOP cycles, a 3-cycle operation with 2-4, a 4-cycle with 1-4, and a 5-cycle instruction with 0-4 cycles, wherein the number of padding NOPs depends during which cycle the interrupt occurred. In step 550, the additional NOP cycles are added before the interrupt service routine execution is started. The pre-interrupt processing ends in step 560. In case of a variable mode, the routine jumps to step 560, in other words no padding is performed.

Figure 6:
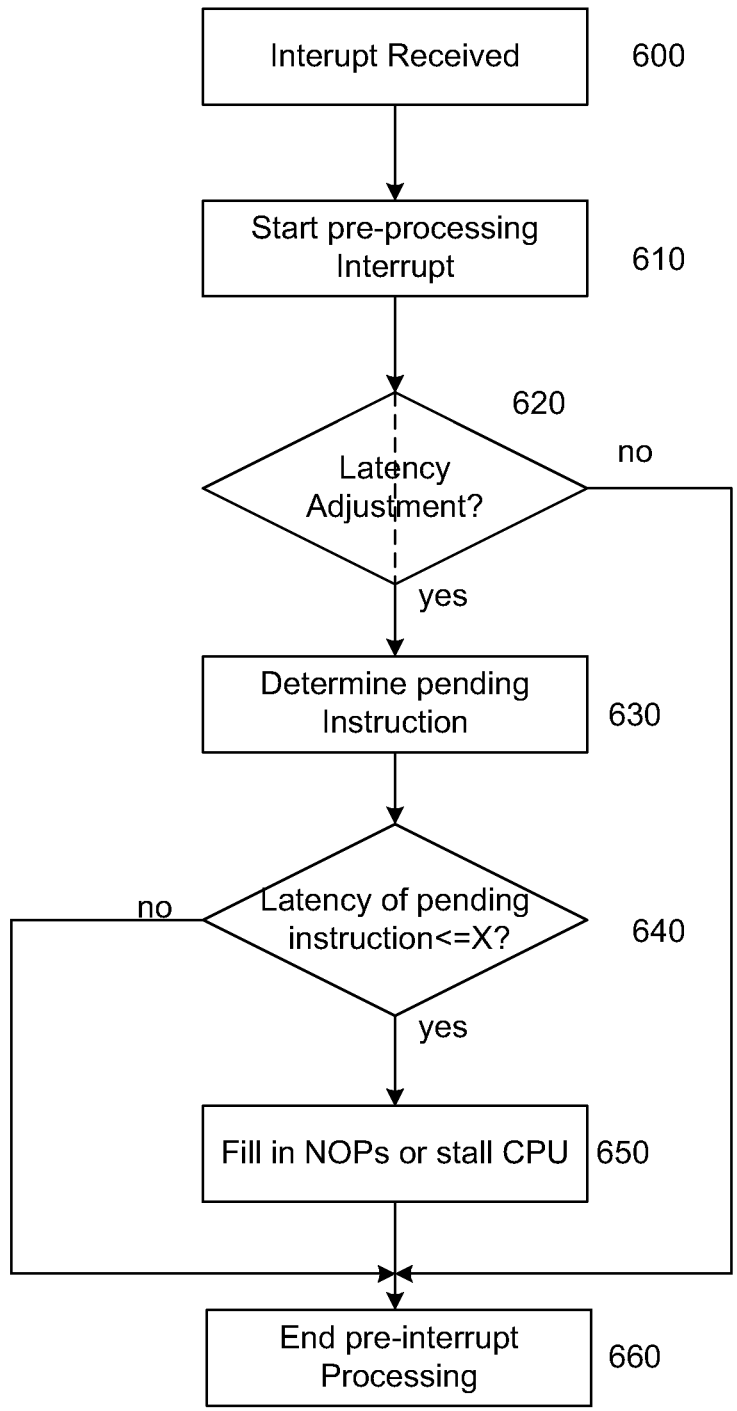
FIG. 6 is a flow-chart showing the principal operation of a second embodiment.
Figure 7:
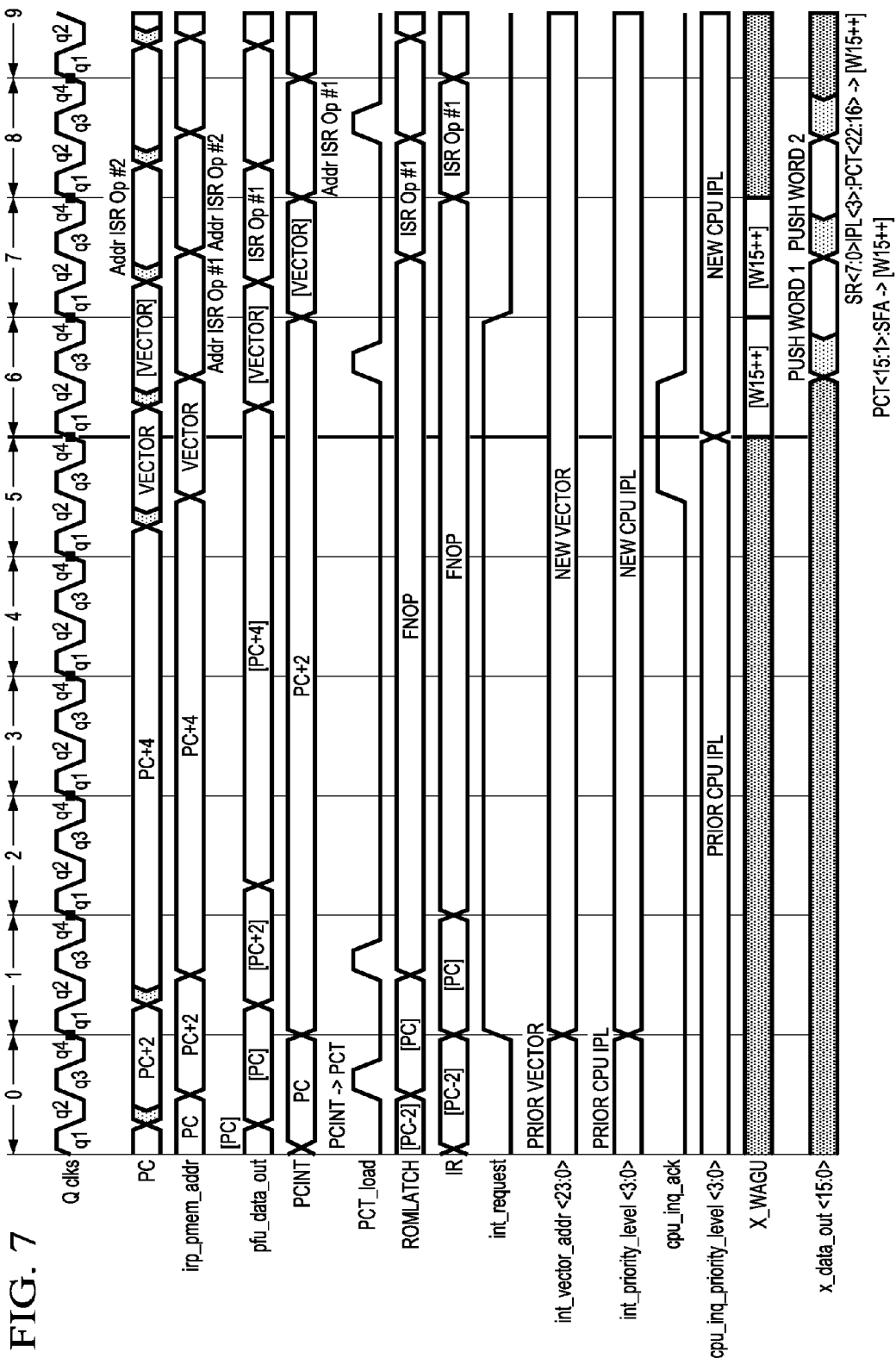
FIG. 7-14 are timing diagrams for a fixed latency.
Figure 8:
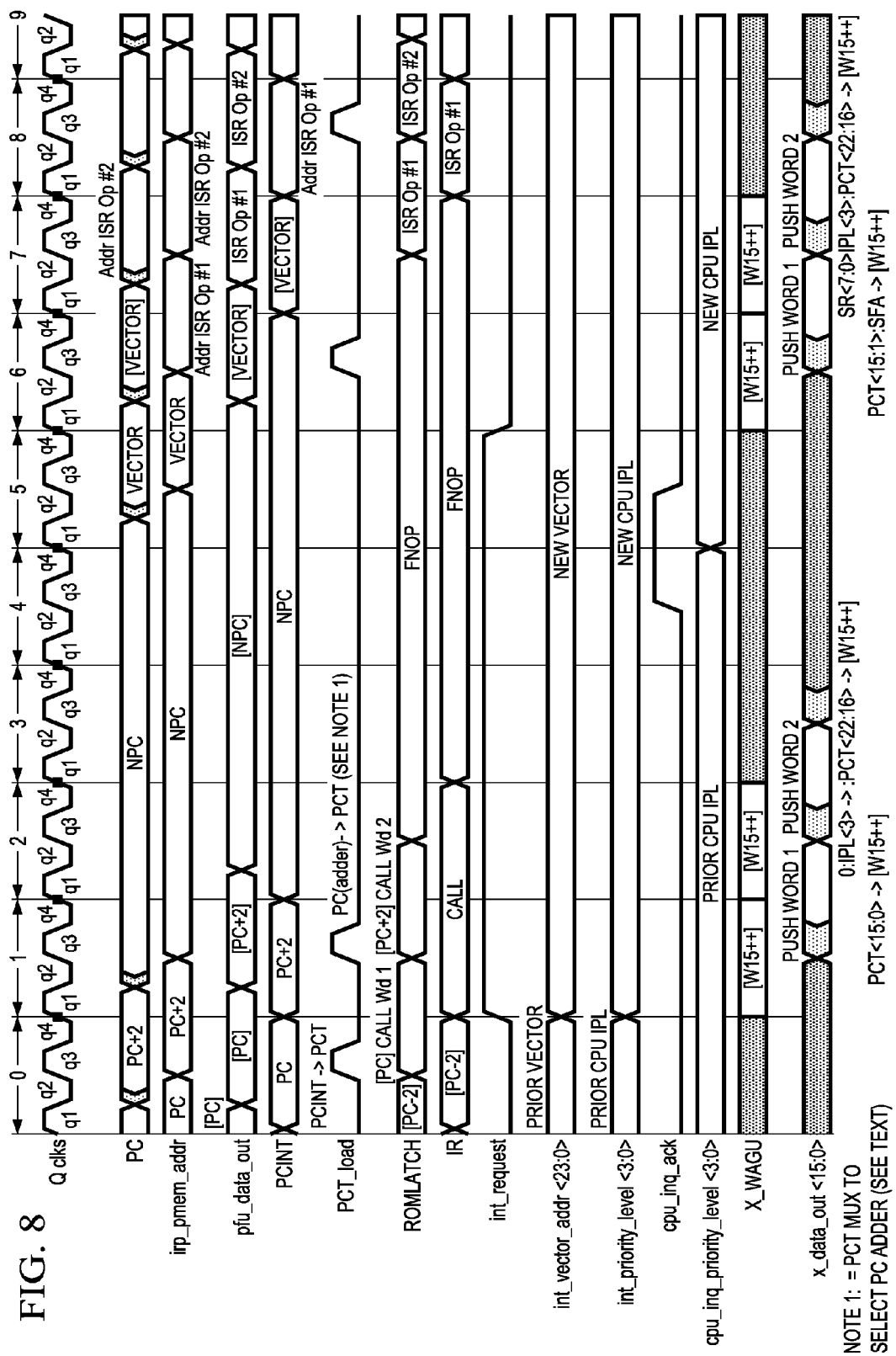

FIG. 6 shows another embodiment with a variable or fixed latency and wherein the threshold between fixed and variable is programmable. According to this embodiment, in one mode a fixed latency can be performed for all instructions that have a latency that is less than a predefined time period X. In this mode, all other instructions cause a variable latency. The other mode corresponds to the variable mode discussed with respect to FIG. 5. To this end, steps 600, 610 and 660 correspond to steps 500, 510, and 560, respectively. In step 620 it is determined whether a latency adjustment is to be performed, if not then a variable latency is performed similarly as discussed in FIG. 5. This step could also be omitted as indicated by the dotted line and instead only a programmable threshold value would trigger one of the two modes. According to another embodiment, multiple threshold values could be provided and the control register could select one of the various threshold values. In step 630 the currently pending instruction is determined. In step 640 it is determined how many cycles are left. If the number of cycles is less than X, then respective padding is performed in step 650 otherwise, the routine jumps to step 660. This embodiment is even more flexible and provides for a limited padding. In the example with instruction that require between 1-5 cycles, a program may only include instruction that have 1, 2, or 3 cycles. Here a restriction can be applied to these type of instruction by setting X=3. Thus, instruction that require 1, 2, or 3 cycles all generate the maximum latency of a 3-cycle latency. In case a 4-cycle or 5-cycle instruction is executed, the latency increases respectively. However, as explained above a user may not use such instructions in a specific program or module and thus can ensure a constant minimum latency even though a conventional processor with fixed latency would not be capable of reducing its interrupt latency beyond that caused by a 5-cycle instruction.

According to yet another embodiment, the concept of multiple fixed and variable latencies can be coupled with exception priority levels. Instead of manually programming the respective mode, an automatic switch of a respective programmable latency is coupled with a priority level in which the processor currently is set to operate. To this end, one or more control registers, for example one or more special function registers 160 as shown in FIG. 1, can be provided which assign a respective latency type to each exception priority level. According to one embodiment, the highest priority interrupt could be assigned to a variable latency for fast response to, for example, an error condition. The next lower priority interrupt would be assigned to a respectively selected fixed latency for guaranteed response time (assuming no error conditions occurred). Other priority levels may have differently assigned latency times. If nesting is enabled, all other lower priority interrupts could be variable or fixed wherein a fixed latency may not be guaranteed for all lower priority exceptions. Software exceptions, such as traps could also be assigned specific latencies or could always be configured to operate with a variable latency.

A more detailed description of the exception (interrupt) handling in combination with a specific embodiment of a microcontroller follows below in combination with various timing diagrams shown in FIGS. 7-20.

According to this specific embodiment, a CPU may supports a prioritized interrupt and trap exception scheme. For example, there can be up to 7 levels of CPU interrupt priority, and up to 62 levels of pre-defined (fixed) 'natural order' priority for interrupts. Each interrupt source has a fixed 'natural order' priority but is user programmable with regard to what CPU priority it uses. The highest priority interrupt is non-maskable. There are also 8 traps available that can be used for internal exceptions. Six slots are currently implemented to improve operational robustness, all of which are non-maskable. They adhere to a predefined priority scheme. Stacking associated with exceptions and subroutine calls is executed on a software stack. A working register W15 is dedicated as the stack pointer and has the least significant bit LSB=0.

The interrupt controller module assembles all of the Interrupt ReQuest (IRQ) signals from the device peripherals and assigns both a fixed 'natural order' priority and a user assigned priority to each IRQ signal. The interrupts are combined with the traps and compared with the current CPU priority. A trap or interrupt (if the CPU priority is less than that of the highest level unmasked interrupt request) is then presented to the processor core along with a vector number and the updated CPU priority value. The CPU priority level is defined by a 4-bit value IPL<3:0>. IPL<3> is located at a mode control register CORCON<3>, and IPL<2:0> reside in a status register SR. The IPL<3> bit can be read at any time and may be cleared by software to allow supervisor trap handlers to jump to another process without having to execute a return from interrupt instruction (RETFIE). In some cases (e.g. during a stack error trap) executing a RETFIE is not an option, so manually clearing bit IPL<3> and re-initializing appropriate parts of the machine is a good alternative to a full reset. Both nested and unnested exceptions are supported through control bit NSTDIS in a control register INTCON1<15>. Nested exceptions are enabled by default out of reset but may be disabled by setting the NSTDIS bit. Unnested interrupt operation is the same as nested in all respects except that the priorities of all interrupts are forced to 7, irrespective of the calling interrupt priority. Consequently, the CPU priority will always end up set to 7 for all interrupts during exception processing. The CPU interrupt priority is automatically modified during exception processing. However, provided interrupt nesting is enabled (NSTDIS=0), IPL<2:0> bits are read/write bits and may also be manipulated by the user to dynamically modify the CPU interrupt priority. If interrupt nesting is disabled (NSTDIS=1), IPL<2:0> bits become read only bits to prevent the user from inadvertently dropping the CPU interrupt priority (and causing any pending interrupts to nest). Any exception of priority greater than the current CPU priority (IPL<3:0>) will be taken and nested (if an exception is in progress and the NSTDIS bit is clear). The current CPU priority IPL<2:0> is stacked with the control register SR, and bit IPL3 is stacked with high byte program counter register PCH. The following stacking sequence applies for all exceptions:

PCL<15:1>→TOS<15:1>; SFA→TOS<0>
(W15)+2→W15
(SR<7:0>)→TOS<15:8>, (IPL<3>: PC<22:16>)→TOS<7:0>
(W15)+2→W15
0→SFA

Note in this embodiment that PCL denotes the low byte program counter, TOS denotes the top of stack, and exception processing handles the SFA (Stack Frame Active) bit in the same manner as it is handled by the CALL {W}, CALLWL and RCALL{W} instructions. The CPU priority is set to equal that of the exception. Upon return, RETFIE unstacks the return program counter PC, status register SR, IPL3 bit and SFA bit to restore the machine its state prior to the exception. A level 0 CPU priority will allow all interrupts and traps to be acknowledged, and a level 7 CPU priority will mask all interrupts but continue to allow traps to occur.

A Global Interrupt Enable (GIE) control function can be provided to provide a means to rapidly disable and re-enable all interrupts in software. When the GIE bit is cleared, a respective macro overrides the incoming CPU interrupt priority level (IPL) (cpu_irq_priority_level<3:0>) setting it to 4'b0111 (Level 7), disabling all interrupts but leaving traps enabled. The actual CPU IPL remains unchanged such that when the GIE bit is set again, the system will return to operating at the prior interrupt priority level. Note in this embodiment: Traps are always nested subject to the limitations.

For a successfully arbitrated exception, the associated vector number represents an offset into either the Primary Interrupt Vector Table (PIVT) or the Auxiliary Interrupt Vector Table (XIVT). The PIVT resides in Primary array program memory, starting at location 0x000004. Similarly, the XIVT resides in Auxiliary array program memory, starting at location 0x7FFFF4. The fuse state of a fuse XIVTEN is used by the Interrupt Controller to determine which of these addresses becomes the base address for the physical vector address generated for the CPU. The PIVT base address is selected when the XIVTEN fuse is set (default state), and the XIVT address is selected when the XIVTEN fuse is clear. These vector tables are always accessible regardless of the existing security mode. Both the PIVT and XIVT contain up to 256 exception vectors. Each interrupt or trap vector contains a 24 bit wide address. The address held in each vector location is the starting address of the associated Interrupt Service Routine (ISR) or Trap Handler.

According to an embodiment, a RESET may not be treated as an exception in this architecture, and can be implemented using a two word GOTO instruction. Although not an exception per se, it is discussed here for the sake of convention. The CPU can reset from either Primary or Auxiliary address space, depending upon the state of the XIVTEN fuse which drives the fus_xivt_enable signal. During reset, the PC is either cleared (fus_xivt_enable=1) or set to 0x7FFF00 (fus_xivt_enable=0). When reset is released, normal instruction execution continues starting with an FNOP (forced NOP) and a prefetch of the GOTO instruction at the selected reset address. The Q clock are held in state Q1 when the device is in reset. The CPU views this first cycle as an FNOP. The second cycle fetches a GOTO instruction from the two program word RESET slot within the selected Interrupt Vector Table. This instruction is then executed as normal and jumps to the start of the user program. Reset sources are:

1. External (pin) reset
2. POR: Power on reset
3. BOR: Brown out reset
4. RESET instruction or execution of any unimplemented opcode
5. Read (for address only) of an uninitialized W register
6. Instruction fetch from unimplemented program address space According to an embodiment, there can be two types of reset on the CPU. A cold reset is the result of a POR or BOR reset. A warm reset is the result of all other reset sources, including the RESET instruction.

According to an embodiment, exception processing is identical for all sources. As stated above, according to an embodiment, reset may not be treated as an exception in this architecture. Exception processing consists of an arbitration phase (cycles), CPU request cycle, CPU acknowledge cycle, vector fetch cycle(s), and instruction prefetch cycle(s) for the first ISR instruction.

The interrupt block 120 as shown in FIG. 1 receives and arbitrates all exceptions. Arbitration can be pipelined such that it takes 2 cycles to complete. The interrupt block 120 then generates an interrupt request signal Int to the CPU 110 on Q1 rising, accompanied by the exception vector address (int_vector_addr<23:0>) and its associated priority (int_priority_level<3:0>). Arbitration is an on going process, producing an updated result every cycle (Q1). Even when signal Int is asserted, the CPU 110 will only lock the arbitration results when it asserts its response signal Ack. Consequently, when operating with nested interrupts enabled (INTCON1<15>, NSTDIS=0), higher priority exceptions can preempt lower priority exceptions underway up to the Q1 prior to the cycle Ack is asserted. This effect can subtract several cycles from "fixed" latency operation and is compensated for accordingly.

Figure 15:
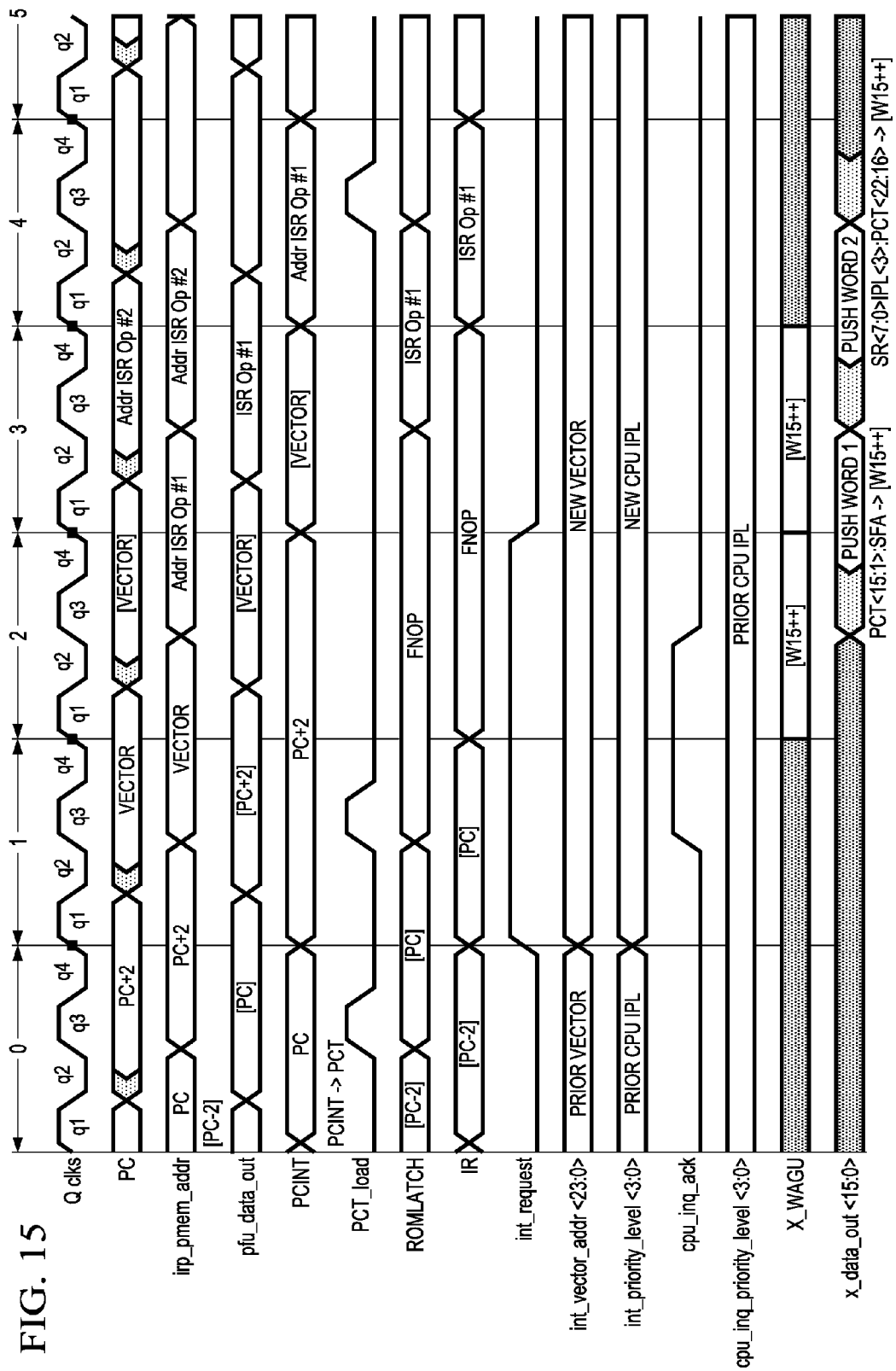
FIG. 15-19 are timing diagrams for a variable latency.

The signal Int is sampled on rising Q1 and will be considered pending during the following cycle. When the instruction currently executing has completed, or the fixed latency timeout has expired, the CPU 110 will acknowledge the exception request from the interrupt controller by asserting Ack on rising Q3 for one cycle. The interrupt controller 120 rescinds Int on the Q1 after Ack is negated, completing the handshake. Variable latency examples are shown in FIG. 15.

The vector fetch is initiated during the CPU acknowledge cycle using the vector address presented to the core by the interrupt controller. The core executes a vector fetch (which for all other purposes may be considered a series of FNOPs) and retrieves the 24-bit vector. The vector is then directed to the PC where it forms the prefetch address for the first ISR instruction. The PC address of the instruction prefetched (but discarded) by the instruction executed immediately prior to exception processing, is saved in PCINT. During the vector fetch, PCINT is copied into PCT in preparation for stacking as the ISR return address. According to an embodiment, the vector and first ISR instruction fetches may take several cycle depending upon the access time of the PS memory supplying the core. The PC is always stacked from the PC temp (PCT) register. The PCT is loaded with one of the following:

The current PC value.

The next PC value (directly from the PC adder) during Q3 of each cycle.

The intermediate PC (PCINT) register

Exception processing for an exception pending during a single cycle instruction (variable latency) is shown in FIG. 15 (which includes relative branches when not taken). All subsequent timing diagrams in FIGS. 7-20 assume single cycle PS memory access. Slower PS memory will require the CPU to be stalled accordingly.

According to an embodiment, a forced NOP (FNOP) instruction (padding) occurs as part of exception processing. A mechanism is provided in the instruction queue to load a NOP instruction into the ROMLATCH value. As a NOP is encoded as 0x000000, an FNOP is the equivalent to clearing the IR on rising Q1.

According to an embodiment, exception processing can operate in one of two modes determined by the state of the VAR bit in mode register CORCON<15>. If VAR (default reset state) and the CPU is set to be the highest priority EDS bus master (MSTRPR<2:0>=3'b0), the CPU will offer a deterministic fixed latency response for any highest priority exception. The interrupt latency from the point at which the interrupt is recognized to the first instruction of the ISR will be fixed for all instructions including TBLRDx or those that require a program space visibility (PSV) access.

If the interrupt recognition point is defined as the Q1 rising that samples the pending interrupts into the interrupt controller, then the fixed latency is determined by:

$$\text{latency}_{VAR=0} = t_{arb} + 5 + 2\eta \text{ cycles}$$

where: $\eta$=PS memory access time (cycles) $t_{arb}$=Arbitration time (cycles) signal Int is asserted after arbitration, and the CPU executes the remainder of the instruction currently underway. Signal Ack is asserted (q3) 5 cycles later, and the vector fetch commences. That is, if the total instruction execution time remaining (from Int asserted) including any CPU stalls is less than 5 cycles in total, the CPU adds FNOPs to bring the total to 5. A fixed latency example for a single cycle instruction is shown in detail in FIG. 7 and for a two-cycle instruction in FIG. 8. According to an embodiment, the implementation may be such that a counter 150 is used during exception processing to force a fixed number of latency cycles. The counter timeout value is determined by parameter INT_LATENCY_DELAY. The following combination of features will break the interrupt latency guarantee when executing from a Flash memory (slower memories will introduce additional delay):

a) LDDW instruction accessing data via PSV. Adds 1 cycle to complete the 2nd PSV fetch. PSV writes are not allowed, so STDW is not an issue.

b) A TBLRDx or PSV access instruction that is associated with a stall. Adds 1 cycle.

c) Last iteration of a REPEATed PSV access. Adds 1 cycle.

If VAR=1 and the CPU is the highest priority EDS bus master (MSTRPR<2:0>=3'b0), the CPU will offer a variable latency response for all exceptions. For a single interrupt system, the interrupt latency from Q1 rising that samples the pending interrupts to the first instruction of the ISR will be:

$$\text{max. latency}_{VAR=1} = t_{arb}\rho + 2\eta \text{ cycles}$$

$$\text{min. latency}_{VAR=1} = t_{arb} + 1 + 2\eta \text{ cycles}$$

where: $\rho$=total instruction execution time during exception processing (cycles) $\eta$=PS memory access time (cycles) $t_{arb}$=Arbitration time (cycles) The above relationship applies for exceptions occurring during any instruction including TBLRDx or during a PSV access. The latency is expressed as a range for any given instruction because the interrupt may arrive at the beginning or end of an instruction. Note that instruction execution time during exception processing can differ from that of normal sequential execution. For example, because all flow change instructions can abort the target PS fetch if an exception is taken, they can execute in 2 cycles during exception processing. The target PS address becomes the exception return address. Also, RAW hazard stalls will (in most cases) not be required following an instruction completed during exception processing, so the stall cycle need not be counted in p.

Figure 20:
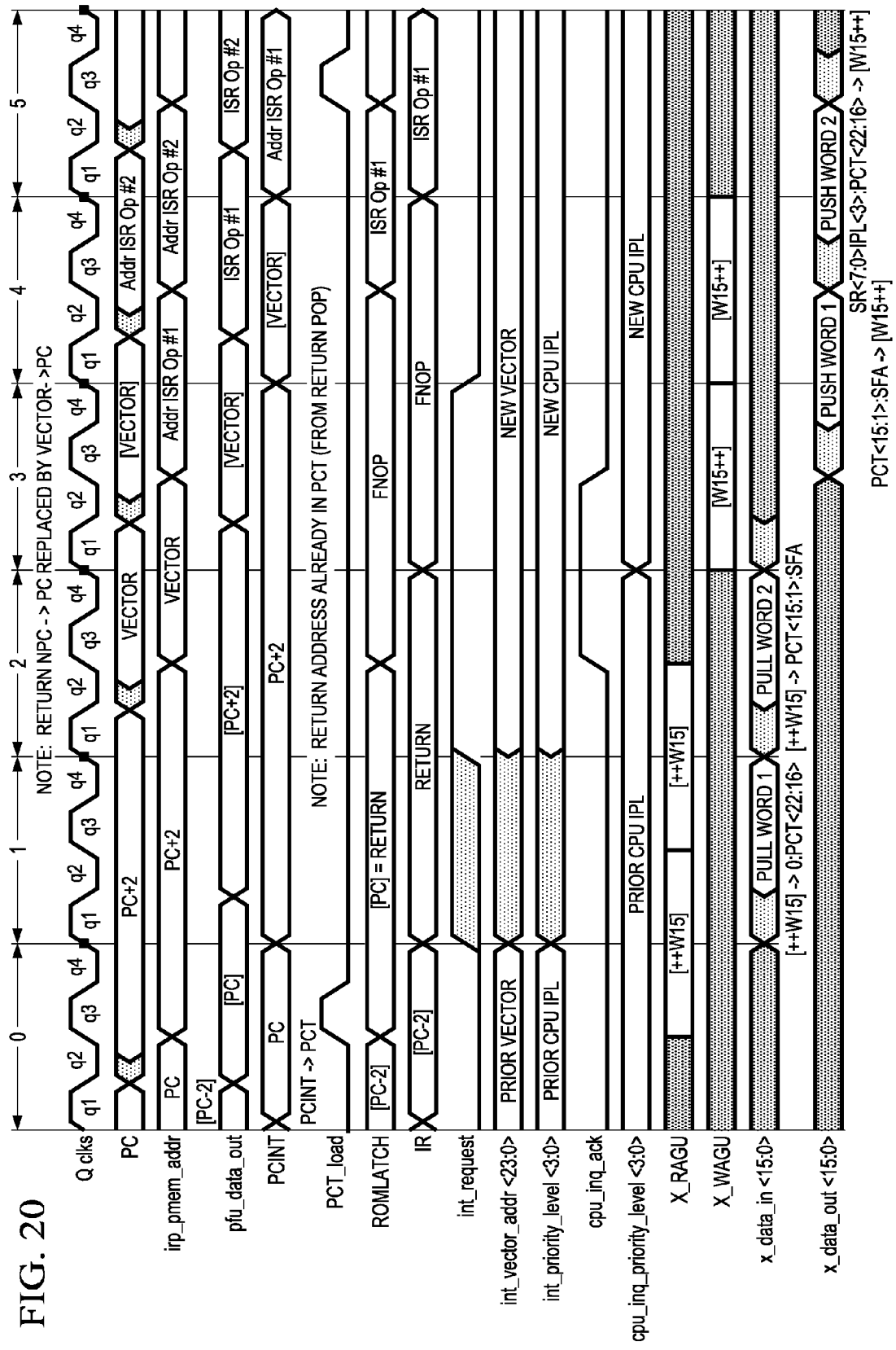
FIG. 20 is an interrupt return timing diagram.

A summary of instructions whose execution times differ when executed during exception processing is shown in Table 1. An example where an interrupt becomes pending during execution of a RETURN class of instruction is shown in FIG. 20.

TABLE 1

EXECUTION TIME DIFFERENCES EXAMPLE

| Instruction | Execution Time (CPU cycles) | |
|---|---|---|
| | Normal [1,3] | During Exception Processing [1] |
| Bcc[2] | 1 (4) | (1) 2 |
| BRAW | 1 (4) | (1) 2 |
| CALL | 4 | 2 |
| CALLW | 4 | 2 |
| GOTO | 4 | 2 |
| GOTOW | 4 | 2 |
| RCALL | 4 | 2 |
| RCALLW | 4 | 2 |
| RETFIE | 6 | 2 |
| RETLW | 6 | 2 |
| RETURN | 6 | 2 |
| Skip instruction | 1 (2/3) | 2 |
| TBLRDH/L | 5 | 5 [3] |
| Individual PSV access | 5 | 5 [3] |
| Repeated PSV access | 1 [4] | 1 [4] |
| RAW hazard stall | 1 | 0 |

Note
[1] Branch taken execution times in brackets
[2] Bcc: any conditional branch instruction
[3] Based on 40 ns 2 × 48-bit interleaved Flash array architecture
[4] Assumes data pipeline full The analysis above also assumes that just one interrupt will be asserted and be processed at any one time. If more than one interrupt is active, and the device is operating in 'non-nested' mode, the longest ISR execution time must be added to the maximum latency because it is possible that the ISR for a lower priority interrupt is just underway when a higher priority interrupt request arrives.

This real-time dilemma is somewhat relieved if 'nested' interrupts are enabled, such that, the highest priority interrupt will be able to interrupt any ISR (other than its own). However, it is still possible that exception processing for a lower priority interrupt could start when a higher priority interrupt subsequently arrives. To avoid keeping the higher priority exception pending until the end of the first ISR instruction (one ISR instruction will always be executed), interrupt pre-emption is supported. Additional latency due to execution of traps is typically not considered part of the real-time performance of an application because traps are usually indications of system problems. Applications switch to working in a recovery mode under these circumstances, where meeting real-time operation goals is less important.

If VAR=1 but the CPU is not the highest priority EDS bus master (MSTRPR<2:0>!=3'b0), the CPU will offer a variable latency response for all exceptions which may also include additional delay resulting from higher priority EDS bus master requests. Even if VAR=0 but the CPU is not the highest priority EDS bus master (MSTRPR<2:0> !=3'b0), the CPU cannot offer a fixed latency response for exceptions because there may also be additional delay resulting from higher priority EDS bus master requests. That is, when the CPU is not operating as the highest priority bus master, exception processing is no longer an atomic operation and may be stalled as necessary to provide EDS bus access to another master. Furthermore, with respect to exception processing, all read and write stalls are considered atomic with the instruction that follows them. That is, should an interrupt or trap request occur during a read or write external stall, exception processing will not commence until after the stall cycle (or cycles) and the instruction following the stall have been completed.

Figure 9:
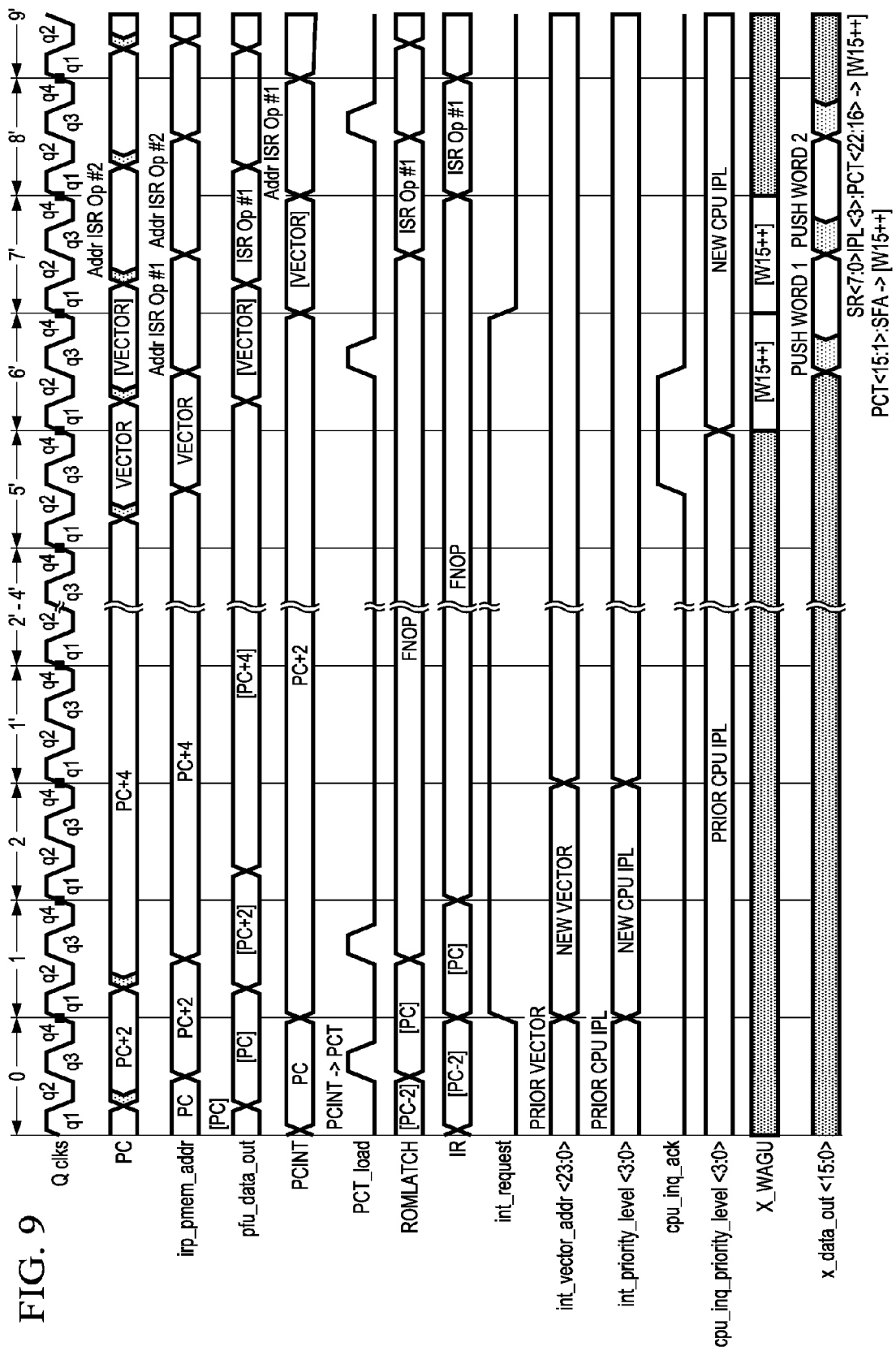
Figure 10:
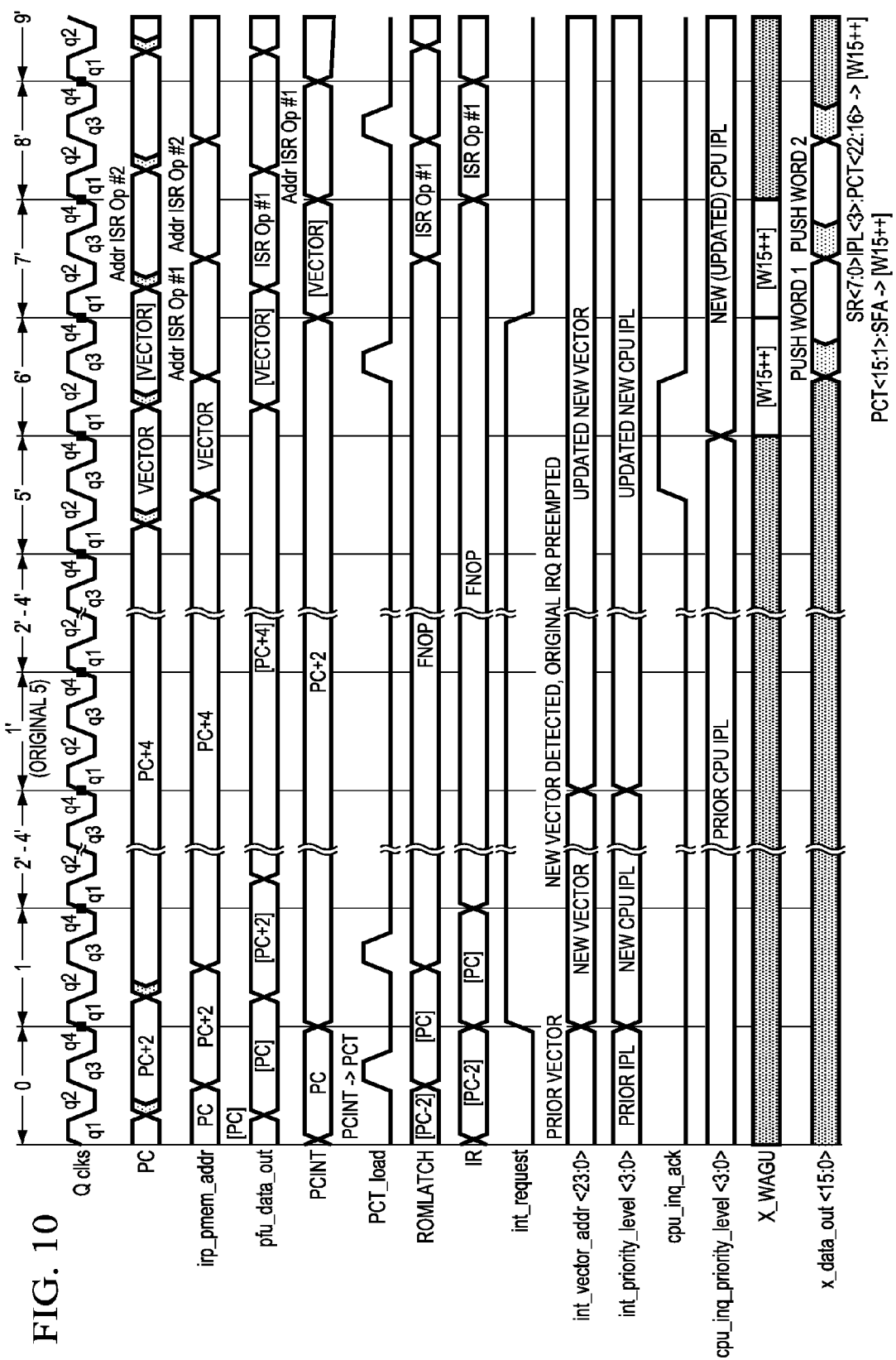
Figure 11:
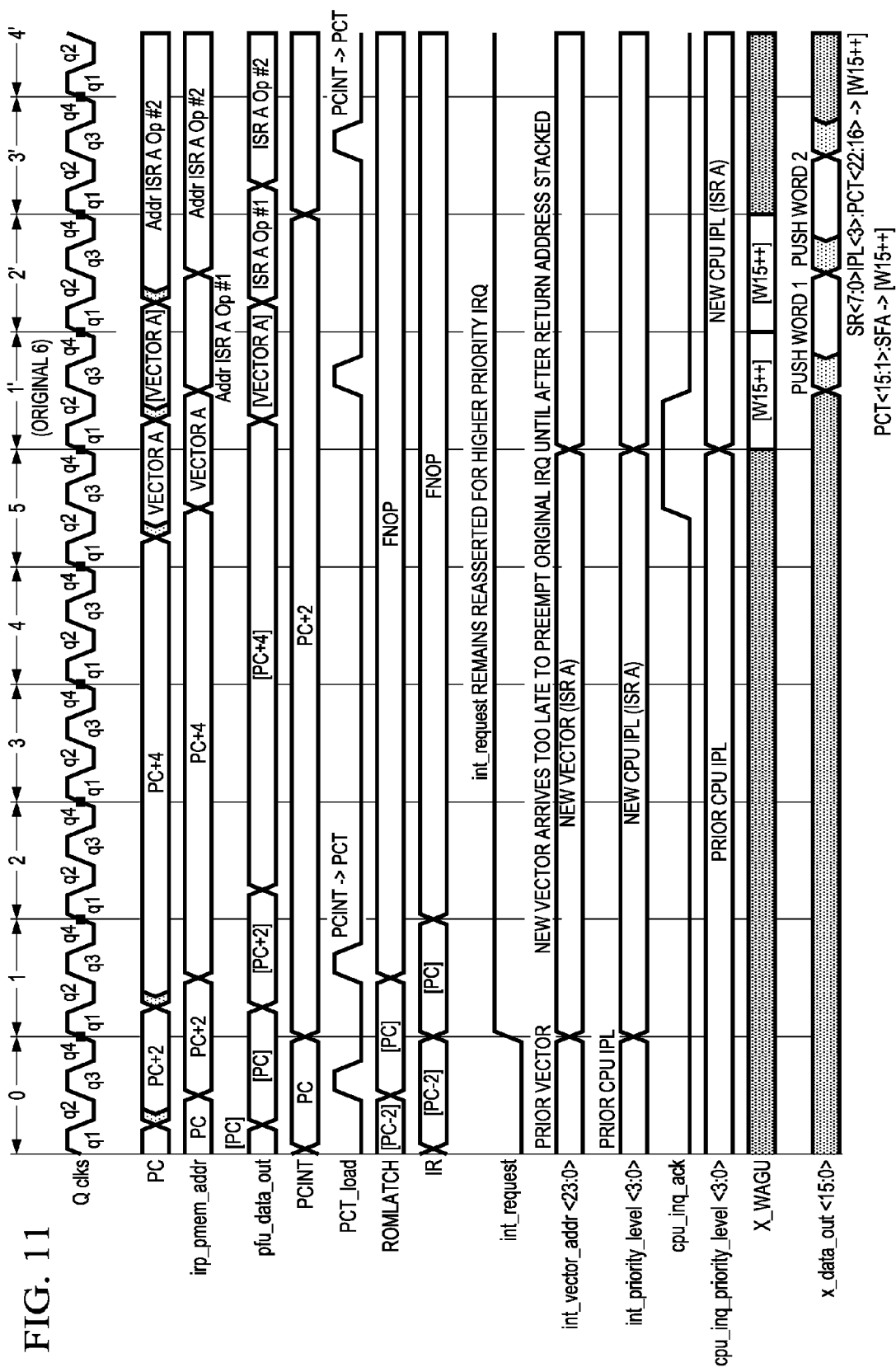
Figure 12:
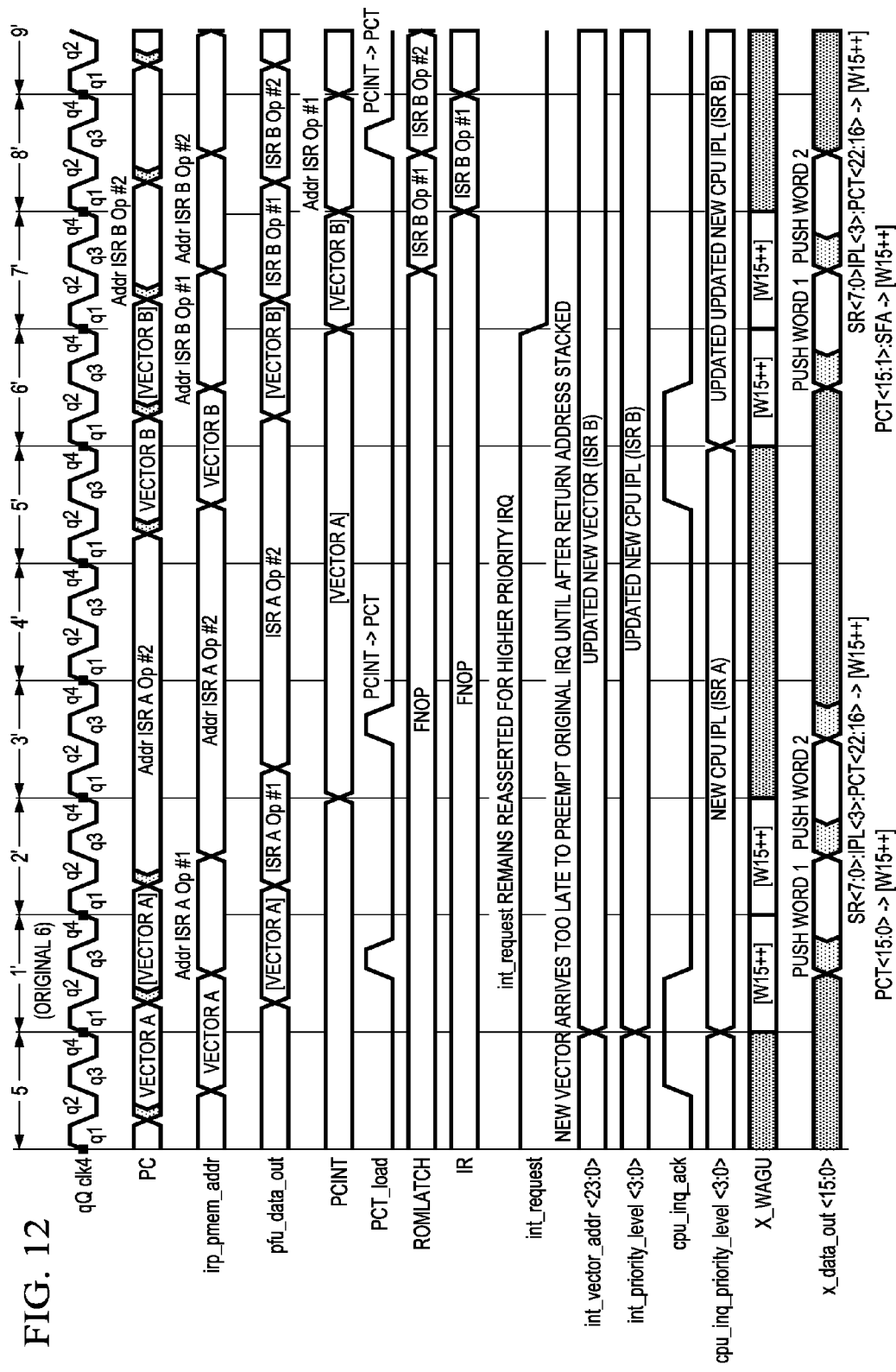
Figure 13:
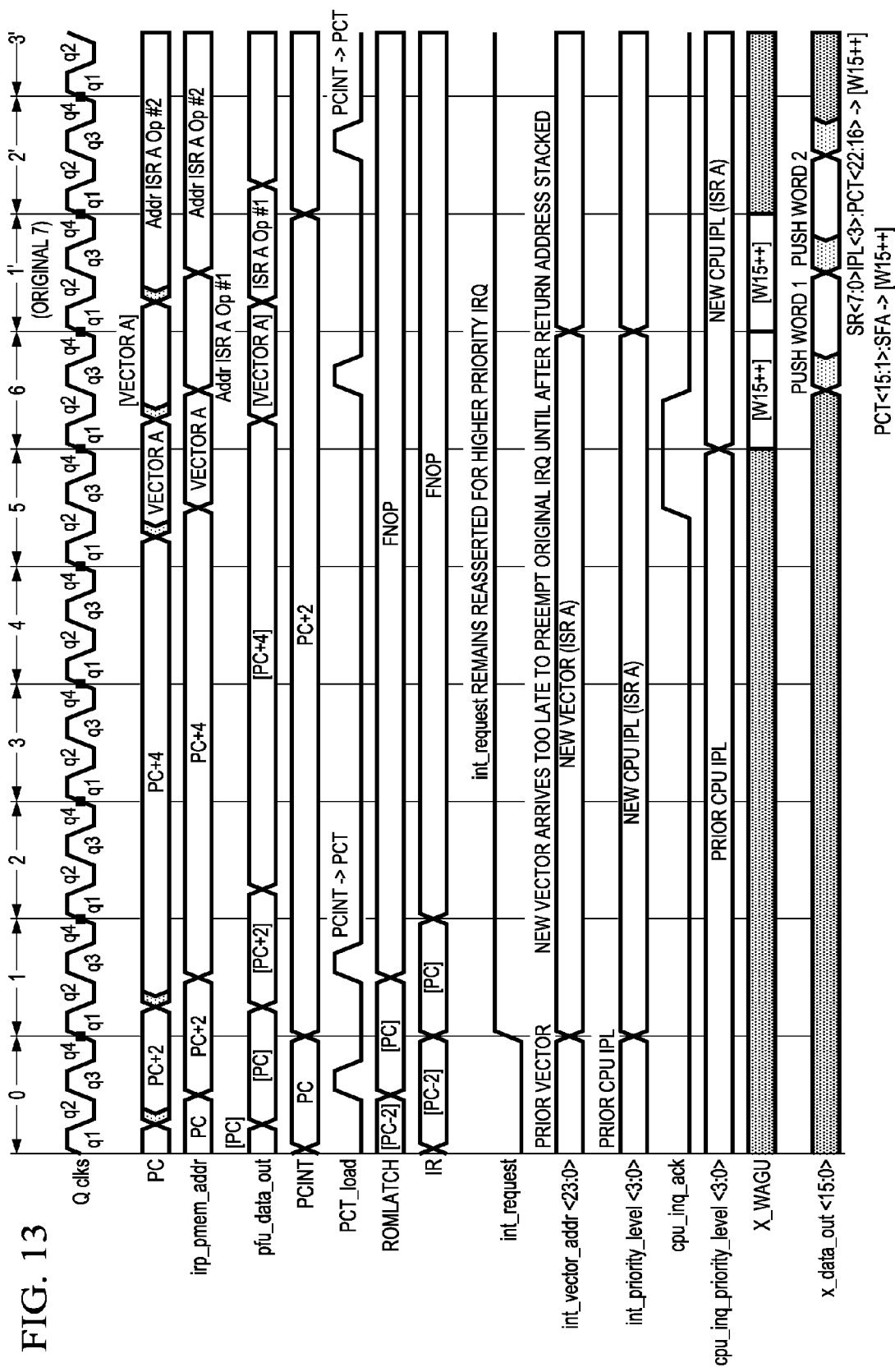
Figure 14:
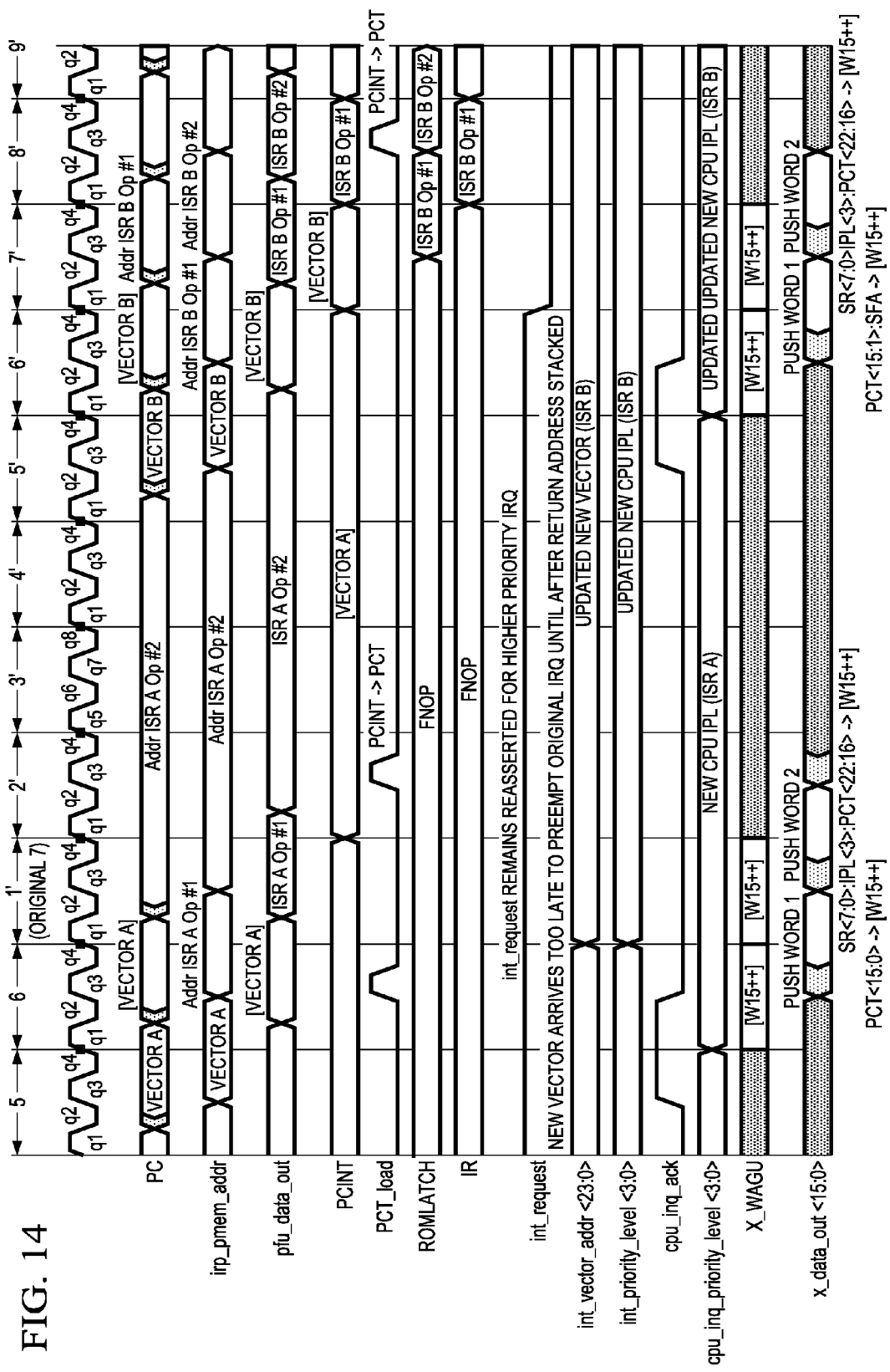

If a change is detected in the exception vector ID that increases priority after signal Int is asserted but before the cycle in which Ack is asserted (cycle 5), the CPU will reset the delay counter. Exception processing for the new highest priority interrupt will then complete as normal as shown in FIGS. 9 and 10 which show preemption in cycles 2 and 5, respectively. Resetting the delay counter forces additional FNOPs to be inserted, thereby continuing to guarantee a fixed latency response time for the highest priority interrupt. If a change is detected in the exception vector ID that increases priority after Ack is asserted but before signal Int is negated (cycles 6 and 7), the CPU will reset the delay counter but complete exception processing already underway (other than the first ISR instruction fetch) during first 2 cycles of the delay. Exception processing for the new highest priority interrupt will then complete as normal (i.e. with the same fixed latency), stacking the address of the first instruction of the original ISR as the return address for the highest priority interrupt. Examples are shown in FIGS. 11, 12 and FIGS. 13, 14. If a change is detected in the exception vector ID that increases priority after signal Int is negated (cycles 8 and beyond), the ISR for the original exception will have already started so normal exception processing is initiated.

Internal stall cycles are associated with the instruction following the stall event and should be counted as part of the total instruction count variable, p. An internal stall cannot occur prior to exception processing stacking because a RAW hazard is not possible (stacking involves data writes only).

Stall cycles as the result of bus arbitration or bus access delays are outwith the control of the CPU. Consequently, exception processing cannot account for them when determining fixed exception latency. If fixed latency is a system level requirement, the user must take appropriate steps to ensure CPU bus arbitration or bus access stalls do not occur.

Figure 16:
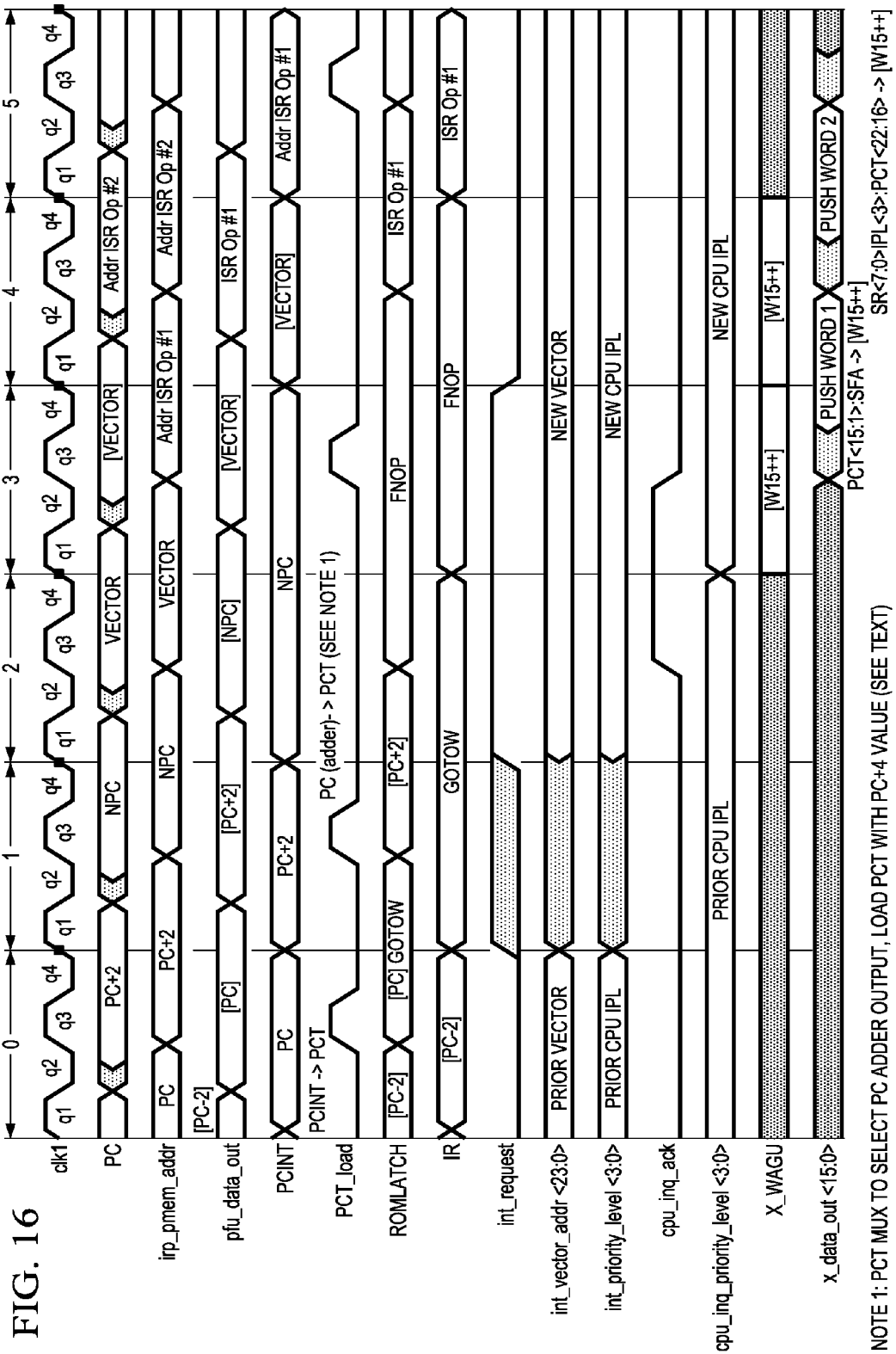
Figure 17:
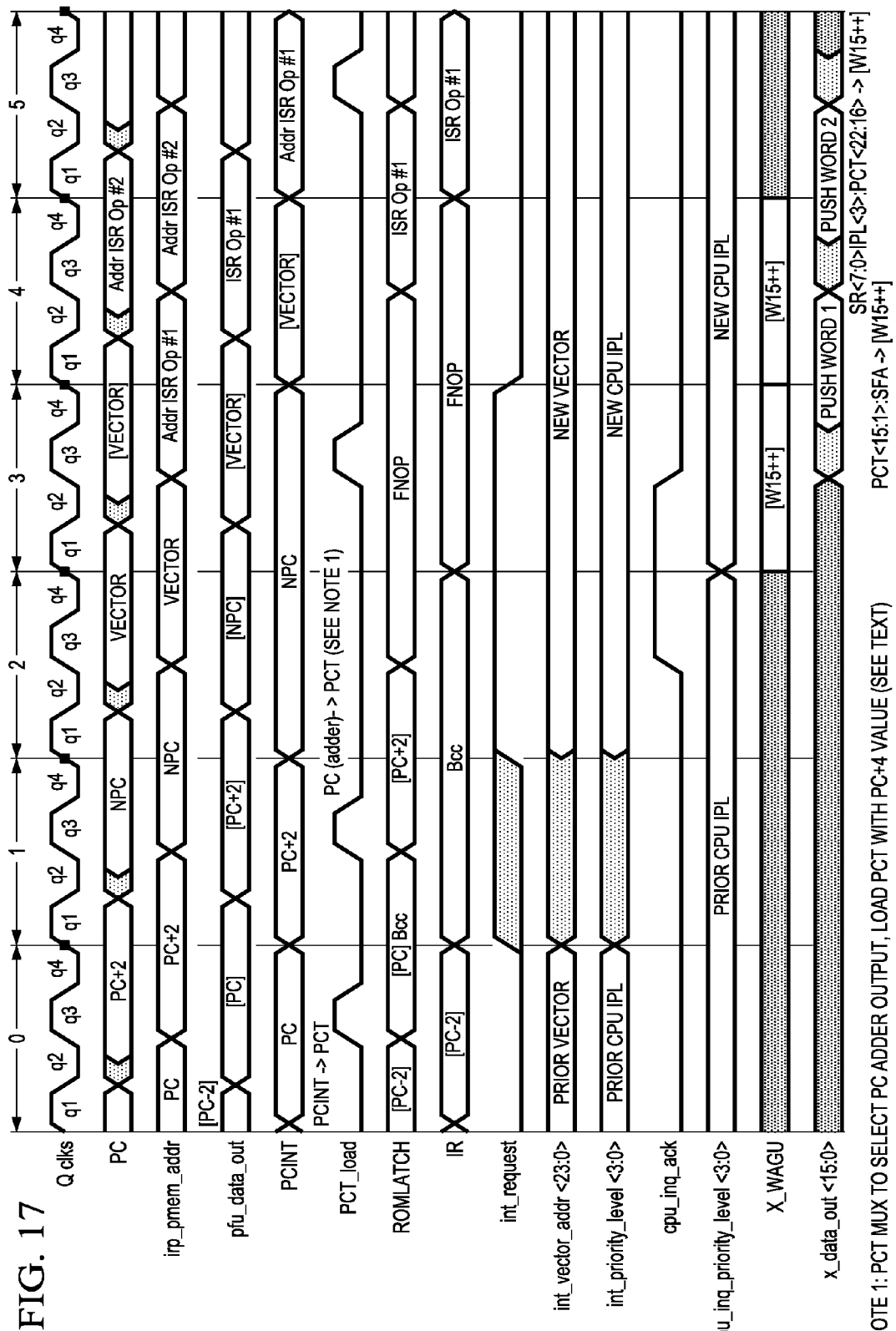
Figure 18:
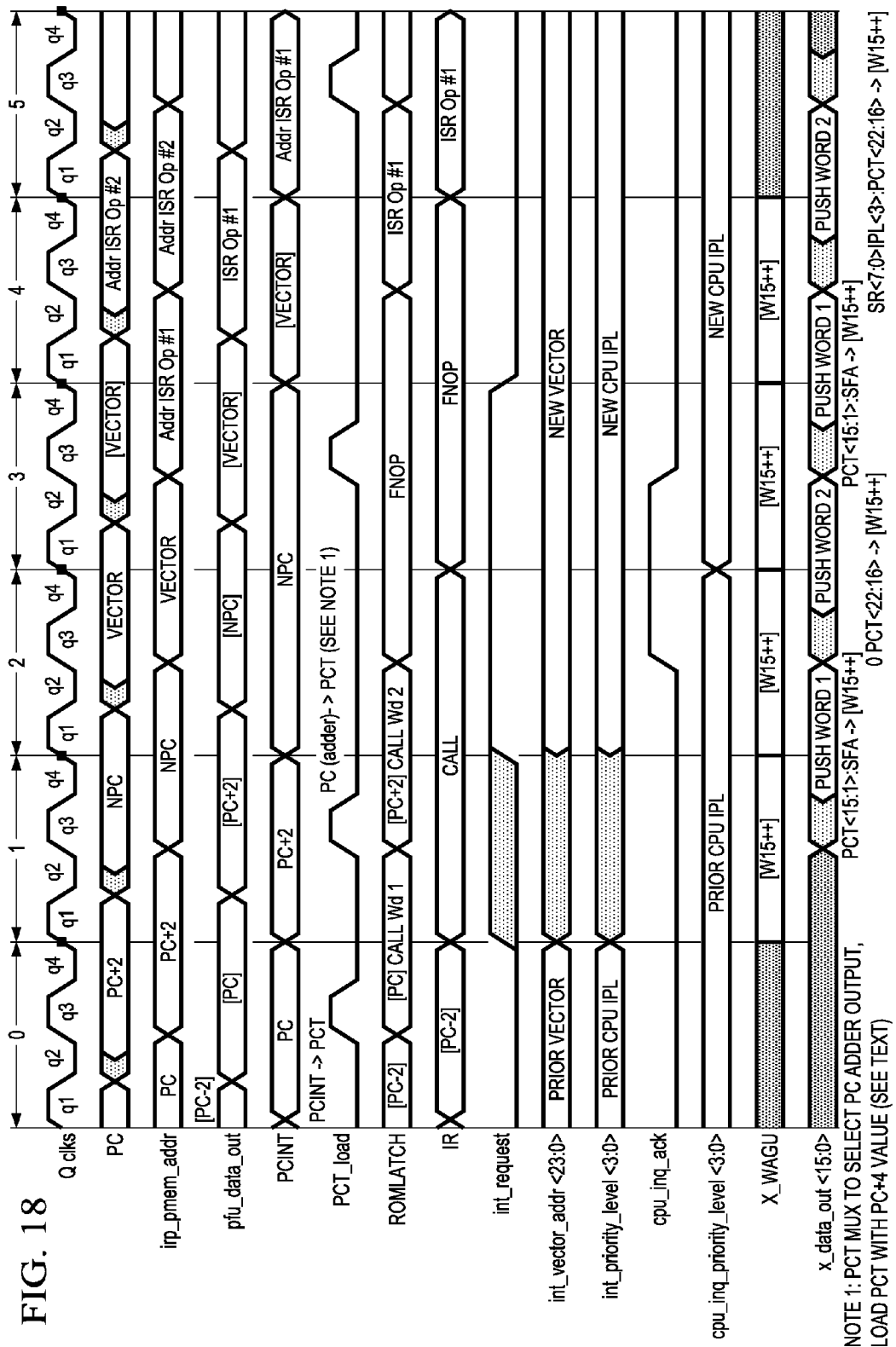
Figure 19:
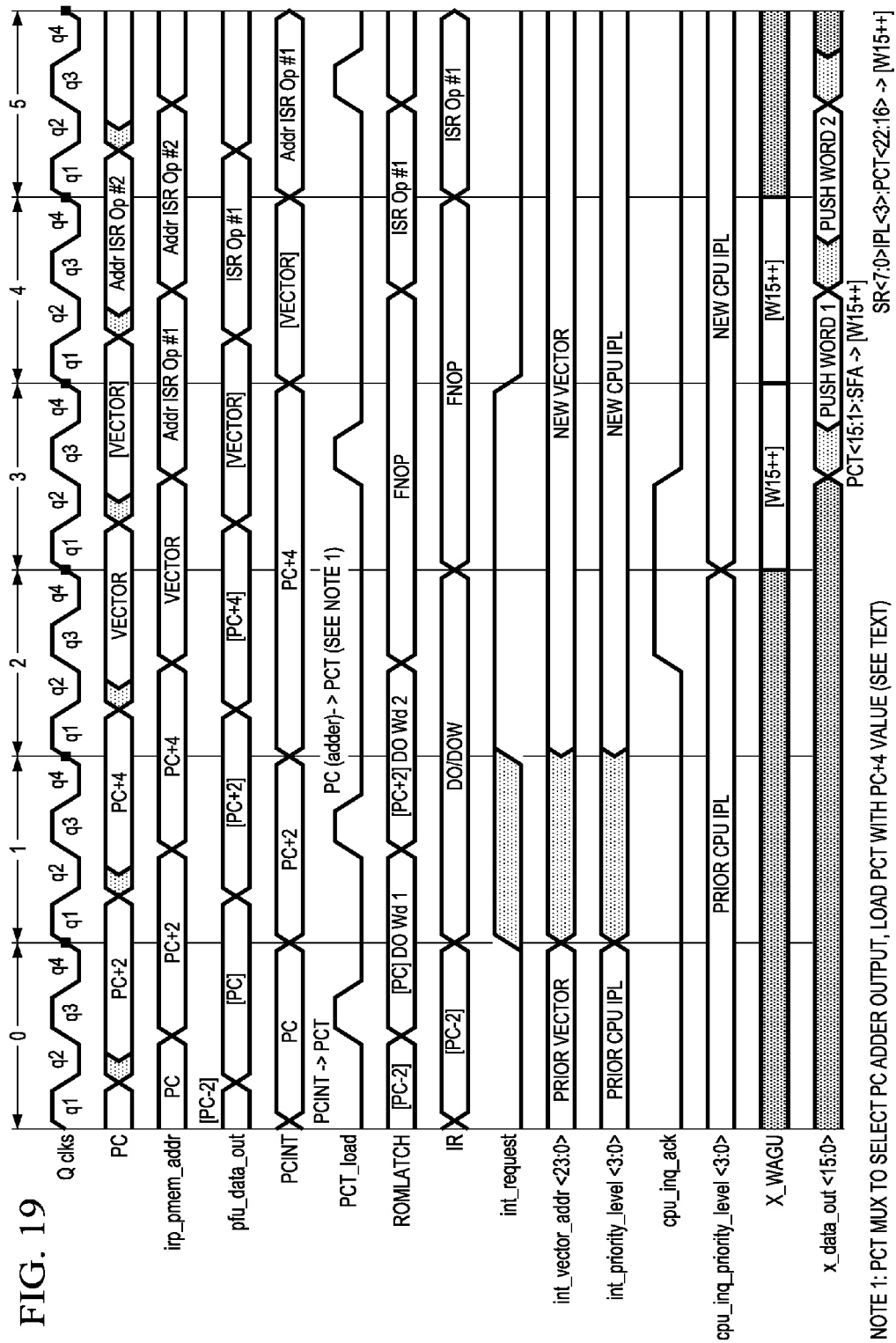

In general, when operating with variable latency (VAR=1), the exception processing acknowledge (Ack) will be postponed until the last cycle of an instruction. For single cycle instructions, this means that after signal Int is asserted, Ack will be asserted on the next q3 during execution of the instruction. For multicycle instructions, Ack assertion will be postponed to q3 of the last instruction cycle. This applies no matter when signal Int arrives during instruction execution. An early exception (i.e. Signal Int arrives at the start of the instruction) for a 2 cycle, 2 word CALL instruction is shown in FIG. 18. Timing for a GOTO is the same (except, of course, there is no GOTO return address to stack). The CALL-class instruction stacks the CALL return address (one word per cycle) which is generated during the first cycle but never appears in the PC. Consequently, the PCT is loaded directly from the PC adder (i.e. the CALL return address) instead of the PC during Q3 of this cycle. Postponing the exception processing return address stacking through the use of a PC temp register (PCT), enables CALL to complete its stacking during the arbitration cycle. The PC to PCINT, then PCINT to PCT transfers are required to preserve the PC value to be stacked during the vector fetch prior to stacking completion. Exception processing during a 2 cycle, 2 word non-flow change instruction (i.e DO/DOW) is shown in FIG. 19. Exception processing is essentially identical to that of CALL or GOTO. Exception processing during 2 cycle, one word GOTOW and Bcc relative branch (taken) instructions is shown in FIG. 16 and FIG. 17 respectively. Note: The PCT update from the PC adder does not strictly occur within exception processing and may be considered an artifact of the instruction (i.e. it will occur with or without an exception pending).

Traps are intended to provide the user a means to correct erroneous operation during debug and when operating within the application. It is to be noted that many of these trap conditions can only be detected when they happen. Consequently, the questionable instruction is allowed to complete prior to trap exception processing beginning. If the user chooses to recover from the error, the result of the erroneous action which caused the trap may therefore have to be corrected. However, data writes to registers and memory, address write-backs and status register updates are all inhibited when an address error trap becomes pending, which helps mitigate the effect of the error. Traps are classified into two distinct categories.

'Soft' traps are exceptions of priority 8 through 12 inclusive. The Stack Error, Math Error and direct memory access controller (DMAC) Error traps fall into this category. A Generic Soft trap is also supported. Soft traps may be considered as non-maskable, nestable interrupts which adhere to a predefined priority as defined in a respective macro. They are processed like interrupts and take 3 cycles to be sampled and acknowledged prior to exception pro-cessing. 'Soft' traps may, therefore, result in additional instructions being executed before the exception is taken. A Generic Soft Trap has been added which, rather than being assigned to a specific error condition like all other soft traps, is assigned to activity within a new special function register (SFR) (Generic Soft Trap SFR). Each bit within the Generic Soft Trap SFR can be assigned to a specific trap error condition. When one (or more) of these bits are set, a Generic Soft Trap is requested. The associated trap handler must then poll the Generic Soft Trap SFR to determine which trap(s) occurred and take appropriate action. This scheme allows the number of soft traps to be extended beyond the limitations of the vector map. Interrupts or lower priority traps that occur while a soft trap is being serviced, will remain pending until the trap handler has completed. The following 'soft' traps are supported with increasing priority:

Generic Soft Trap: This trap will be taken if any bit (or bits) within SFR INTCON3 (located within the respective macro) is set. INTCON3<4> bit is assigned to the DO stack overflow trap. It is set by the CPU whenever a DO stack overflow is detected.

DMAC Error Trap: A DMAC Error Trap will execute whenever a write collision between the DMAC and the CPU. This can only occur at a dual ported peripheral data register.

Math Error Trap: The Math Error trap will execute under the following three circumstances. It is assumed that the digital signal processor (DSP) engine configuration will be consistent within an application, so polling flags to determine the error condition should not be necessary.

1. Should an attempt be made to divide by zero, the divide operation will be aborted on a cycle boundary and the trap taken. The PC stacked will point to the instruction being fetched at the time the divide was aborted.

2. If the following conditions are all true, an Math Error trap will be taken. a) Bit OVATE is set (INTCON1<10>) b) Accumulator A is operating with 1.31 saturation disabled or in 9.31 mode c) An arithmetic operation caused an overflow from bit 31 of accumulator A OR a) Bit OVBTE is set (INTCON1<9>) b) Accumulator B is operating with 1.31 saturation disabled or in 9.31 mode c) An arithmetic operation caused an overflow from bit 31 of accumulator B 3. If the following conditions are all true, an Math Error trap will be taken. a) Bit COVTE is set (INTCON1<8>) b) Either Accumulator A or B is operating with all saturation disabled c) An arithmetic operation caused an overflow from bit 39 (catastrophic overflow) of the accumulator with all saturation disabled 4. If an attempt is made to execute a shift accumulator instruction (SFTAC) with a shift value of greater than 16 or less than −16, the instruction will complete (without a result write) and a math trap will be taken. The PC stacked will point to the instruction fetched while SFTAC was executing.

According to an embodiment, if the user does not intend to take corrective action in the event of a trap error condition, these vectors should be loaded with an address that points to a default handler containing a reset instruction. Note that just vectoring to the reset address will restart the user code but will not initiate a device reset.

Stack Error Trap: This trap will be taken if:
1. A stack pointer based access is attempted with an effective address (EA) which is less than 0x0800.
2. Stack overflow protection is enabled, and a stack pointer based access is attempted with an EA which is greater than the (user programmable) limit value written into the stack pointer limit value (SPLIM) register.
3. A link (LNK) instruction is executed when the Stack Frame Active (SFA) bit in core configuration register (CORCON<2>) is already set, indicating a nested stack frame error.
4. An unlink (UNLK) instruction is executed when the Stack Frame Active (SFA) bit in CORCON<2> is already clear, indicating a stack frame unlink error.

'Hard' traps are exceptions of priority 13 through 15. The Oscillator Fail, Address Error and Software traps fall into this category. Hard traps may also be considered as nonmaskable, nestable interrupts which adhere to a predefined priority as defined in a respective macro. No more instructions will be executed following the instruction during which the trap event occurred. The CPU will execute forced no-operation instructions (FNOPs) until exception processing begins, which will happen after the trap is acknowledged by the CPU. A consequence of this is that if a hard trap is not acknowledged, the CPU will execute FNOPs forever. Therefore, if a lower priority hard trap becomes pending while another (higher priority) hard trap has:

a) Occurred,
b) Been acknowledged
c) Exception processing underway or
d) Its handler is executing, then the device is forced to reset. This overcomes a 'deadly embrace' problem where the higher priority trap is suspended (executing FNOPs) waiting for the lower priority trap to be acknowledged, while the lower priority trap remains pending, waiting for the higher priority trap to complete. This is considered to be a double hard trap error, and will cause the TRAPR bit in the RCON register to be set. Recovery through software is unlikely, so the best recourse is a reset. If a higher priority trap occurs while a lower priority trap is in progress, the lower priority trap will execute one more instruction, then execute FNOPs until the higher priority trap is acknowledged. Exception processing for the higher priority trap then ensues. That is, a lower priority trap can be relegated to 'pending' during execution of a higher priority trap provided the lower priority trap has already been acknowledged (i.e. the higher priority trap occurs after the lower priority trap has been acknowledged). The following 'hard' traps are supported with increasing priority:

Generic Hard Trap: A hard trap is generated under the following conditions:
1. The SWTRAP bit at INTCON2<13> is set
2. Any bit (or bits) within INTCON4<15:0> is set
SFRs INTCON2 and INTCON4 are located within a respective macro. The Software Trap is the lowest priority hard trap to allow other hard traps to nest without forcing a double trap error reset. The function of the bits in INTCON4<15:0> is defined in the variant top-level DOS. They may be associated with any exception source for which a hard trap is deemed necessary.

Address Error Trap: In the presence of an address error, the source or destination W registers, target memory address or user writeable status register bits will not be changed (i.e. the register write-back of the modified EA, data write and SR update will be inhibited). This trap will be initiated when any of the following circumstances occurs:
1. A misaligned data word access is attempted.
2. A data access to unimplemented data address space is attempted. Applies to both single operand (combined X & Y address space) and dual operand (split X & Y address space). Note that when the address space is split, unimplemented X address space includes all of Y space, and unimplemented Y address space includes all of X space.
3. An attempted instruction fetch from unimplemented program space.
4. An attempted instruction fetch from vector space (other than the reset GOTO instruction).
5. A data read from unimplemented program space using either table instructions or PSV.

Oscillator Fail Trap: This trap will be initiated should the external oscillator fail and operation become reliant on an internal RC backup.

What is claimed is:

1. A digital processor having programmable exception processing latency, comprising:
    a central processing unit (CPU) of a digital processor operable to execute instructions with variable execution times,
    an exception controller coupled with said CPU, wherein when said CPU receives an exception signal a minimum exception latency time depends on an execution time of an instruction that needs to be executed before an exception can be served by the CPU,
    a control register coupled with said CPU, wherein the control register is operable to set the operation mode of said CPU in at least one of two modes, wherein in a first mode the CPU has a fixed exception processing latency time, and in a second mode the CPU has a variable exception processing latency time depending on an execution time of a pending instruction which must be completed before serving the exception.

2. The digital processor according to claim 1, wherein the exception controller is an interrupt controller.

3. The digital processor according to claim 1, wherein the digital processor is a microcontroller or digital signal processor.

4. The digital processor according to claim 1, wherein the control register comprises a latency selection bit which is programmable.

5. The digital processor according to claim 4, wherein the latency selection bit in the control register is dynamically programmable depending upon a software application.

6. The digital processor according to claim 1, wherein the second mode is only selected when a latency of an exception is less than or equal to a predefined threshold.

7. The digital processor according to claim 6, wherein the predefined threshold is programmable.

8. The digital processor according to claim 6, wherein the predefined threshold is stored in said control register.

9. The digital processor according to claim 1, further comprising a counter operable to generate a signal for stalling an execution unit in said CPU.

10. A method for processing an exception in a processor, comprising a central processing unit (CPU) operable to execute instructions with variable execution times, wherein when said CPU receives an exception signal (Int) an minimum exception latency time depends on an execution time of an instruction that needs to be executed before an exception can be served by the CPU, the method comprising:
    setting one of at least two operating modes for the processor;
    receiving an exception by the CPU;
    pre-processing the exception; and
    executing an exception service routine;
    wherein in a first mode the CPU has a fixed exception processing latency time, and in a second mode the CPU has a variable exception processing latency time which depends on an execution time of a pending instruction which must be completed before serving the exception.

11. The method according to claim 10, wherein the step of setting one of at least two operating modes for the CPU is performed by programming a latency selection bit in a control register.

12. The method according to claim 11, wherein the latency selection bit in the control register is dynamically programmed depending upon a software application.

13. The method according to claim 11, wherein the second mode is only selected when a latency of an exception is less than or equal to a predefined threshold.

14. The method according to claim 13, wherein the predefined threshold is programmable.

15. The method according to claim 14, wherein the predefined threshold is stored in said control register.

16. The method according to claim 10, wherein a pending instruction is executed before execution of the exception service routine, said pending instruction requires a specific number of processing cycles for execution and wherein the processor can execute a plurality of instructions which require for execution at least one of a minimum amount of processing cycles and a maximum amount of processing cycle.

17. The method according to claim 16, wherein in the first mode a first number of processing cycles required by an instruction is extended to a maximum amount of processing cycles required by an instruction of an instruction set of the CPU which requires the most number of processing cycles.

18. The method according to claim 17, wherein the first number of processing cycles is extended by inserting one or more no-operation instructions.

19. The method according to claim 17, wherein the first number of processing cycles is extended by stalling said processor.

20. The method according to claim 17, wherein the first number of processing cycles of an instruction is only extended by inserting one or more no-operation instructions up to a predefined number of cycles if the first number of processing cycles is less than the predefined number of cycles.

21. The digital processor according to claim 1, wherein an instruction requires n cycles for execution, n being an integer greater than 0, and wherein an instruction set of the CPU includes at least two different types of instructions requiring a different number of cycles for execution.

22. The digital processor according to claim 1, wherein the CPU is operable to execute a first set of instructions in one cycle and a second set of instructions in two cycles.

* * * * *